United States Patent
Mildh et al.

(10) Patent No.: US 11,375,557 B2
(45) Date of Patent: Jun. 28, 2022

(54) INTERNET PROTOCOL (IP) ADDRESS ASSIGNMENT IN INTEGRATED ACCESS BACKHAUL (IAB) NETWORKS

(71) Applicant: Telefonaktiebolaget LM Ericsson (publ), Stockholm (SE)

(72) Inventors: Gunnar Mildh, Sollentuna (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 184 days.

(21) Appl. No.: 16/465,201

(22) PCT Filed: May 3, 2019

(86) PCT No.: PCT/SE2019/050392
§ 371 (c)(1),
(2) Date: May 30, 2019

(87) PCT Pub. No.: WO2019/240646
PCT Pub. Date: Dec. 19, 2019

(65) Prior Publication Data
US 2020/0120725 A1    Apr. 16, 2020

Related U.S. Application Data

(60) Provisional application No. 62/684,514, filed on Jun. 13, 2018.

(51) Int. Cl.
*H04W 76/12* (2018.01)
*H04L 61/5014* (2022.01)
(Continued)

(52) U.S. Cl.
CPC ......... *H04W 76/12* (2018.02); *H04L 61/2015* (2013.01); *H04W 12/041* (2021.01); *H04W 60/00* (2013.01); *H04W 92/045* (2013.01)

(58) Field of Classification Search
CPC .. H04L 61/2015; H04W 60/00; H04W 76/12; H04W 88/08; H04W 12/041;
(Continued)

(56) References Cited

U.S. PATENT DOCUMENTS

2010/0046418 A1*  2/2010  Horn .................... H04W 40/22
                                                          370/315
2017/0099685 A1*  4/2017  Wallentin ............. H04W 48/16
(Continued)

OTHER PUBLICATIONS

U.S. Appl. No. 62/619,479, filed Jan. 19, 2018 (Year: 2018).*
(Continued)

*Primary Examiner* — Rina C Pancholi
(74) *Attorney, Agent, or Firm* — Murphy, Bilak & Homiller, PLLC

(57) ABSTRACT

Embodiments include methods and/or procedures performed by an integrated access backhaul, IAB, node of a radio access network, RAN, that is associated with a core network, CN. Such embodiments include performing a registration with a CN node, and establishing a secure connection with a RAN node. Such embodiments also include receiving, from the RAN node via the secure connection, configuration information for one or more radio bearers between the IAB node and the RAN node. The radio bearers are adapted for backhaul of control plane information and/or user plane information. Such embodiments also include establishing, with the RAN node via at least one of the radio bearers, one or more Internet Protocol addresses usable by the IAB node. Other embodiments include complementary methods and/or procedures performed by CN nodes and RAN nodes, as well as network nodes configured to perform the various methods and/or procedures.

19 Claims, 21 Drawing Sheets

(51) Int. Cl.
   *H04W 60/00* (2009.01)
   *H04W 92/04* (2009.01)
   *H04W 12/041* (2021.01)
(58) Field of Classification Search
   CPC ............ H04W 16/14; H04W 56/0015; H04W 68/005; H04W 68/02; H04W 74/0808; H04W 76/28; H04W 92/045
   See application file for complete search history.

(56) References Cited

U.S. PATENT DOCUMENTS

| | | | |
|---|---|---|---|
| 2017/0325094 A1* | 11/2017 | Lee | H04W 12/037 |
| 2019/0037414 A1* | 1/2019 | Saito | H04W 16/26 |
| 2020/0146109 A1* | 5/2020 | Majmundar | H04W 92/14 |
| 2021/0076368 A1* | 3/2021 | Malkamaki | H04W 4/20 |
| 2021/0092667 A1* | 3/2021 | Zhu | H04W 24/02 |
| 2021/0259051 A1* | 8/2021 | Latheef | H04W 76/12 |

OTHER PUBLICATIONS

"TS 23.501 V15.1.0"; 3rd Generation Partnership Project; Technical Specification Group Services and System Aspects; System Architecture for the 5G System; Stage 2 (Release 15); Mar. 2018, pp. 1-201.

Droms, R., "Dynamic Host Configuration Protocol", Network Working Group; Request for Comments: 2131; Obsoletes: 1541; Category: Standards Track, Mar. 1997, pp. 1-45.

Narten, T., et al., "Neighbor Discovery for IP version 6 (IPv6)", Network Working Group; Request for Comments: 4861; Obsoletes: 2461; Category: Standards Track, Sep. 2007, pp. 1-97.

Plummer, David C., "An Ethernet Address Resolution Protocol", Network Working Group, RFC 826, https://tools.ietf.org/html/std37, Nov. 1982, pp. 1-9.

Tuexen, M., et al., "Datagram Transport Layer Security (DTLS) for Stream Control Transmission Protocol (SCTP)", Internet Engineering Task Force (IETF); Request for Comments: 6083; Category: Standards Track; ISSN: 2070-1721, Jan. 2011, pp. 1-9.

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

"3GPP TR 38.874 V0.2.1", 3rd Generation Partnership Project; Technical Specification Group Radio Access Network; Study on Integrated Access and Backhaul; (Release 15), May 2018, pp. 1-19.

"3GPP TS 33.401 V15.3.0", 3rd Generation Partnership Project; Technical Specification Group Services and System Aspects; 3GPP System Architecture Evolution (SAE); Security architecture (Release 15), Mar. 2018, pp. 1-163.

"3GPP TS 33.501 V15.0.0", 3rd Generation Partnership Project; Technical Specification Group Services and System Aspects; Security architecture and procedures for 5G system (Release 15) (S3-182047), Mar. 2018, pp. 1-128.

"3GPP TS 38.331 V15.1.0", 3rd Generation Partnership Project; Technical Specification Group Radio Access Network NR; Radio Resource Conlrol (RRC) protocol specification (Release 15), Mar. 2018, pp. 1-268.

"3GPP TS 38.401 V15.1.0", 3rd Generation Partnership Project; Technical Specification Group Radio Access Network NG-RAN; Architecture description (Release 15), Mar. 2018, pp. 1-23.

"3GPP TS 38.473 V15.0.0", 3rd Generation Partnership Project; Technical Specification Group Radio Access Network NG-RAN; F1 application protocol (F1AP); (Release 15), Dec. 2017, pp. 1-90.

"3GPP TS 38.474 V15.0.0", 3rd Generation Partnership Project; Technical Specification Group Radio Access Network NG-RAN; F1 data transport (Release 15), Jan. 2018, pp. 1-8.

"3GPP TS 38.473 V15.1.1"; 3rd Generation Partnership Project; Technical Specification Group Radio Access Network NG-RAN; F1 application protocol (F1AP) (Release 15), Apr. 2018, pp. 1-106.

"Architecture for integrated access and backhaul", 3GPP TSG-RAN WG2 NR AH1801; R2-1801022; Vancouver, Canada; Jan. 22-26, 2018, pp. 1-9.

"Usage of tunnelling or forwarding on the IAB backhaul", 3GPP TSG-RAN WG3 #99; R3-181314; Athens, Greece; Feb. 26-Mar. 2, 2018, pp. 1-6.

"3GPP TR 33.816 V10.0.0", 3rd Generation Partnership Project; Technical Specification Group Services and System Aspects; Feasibility study on LTE relay node security; Release 10, Mar. 2011, pp. 1-94.

\* cited by examiner

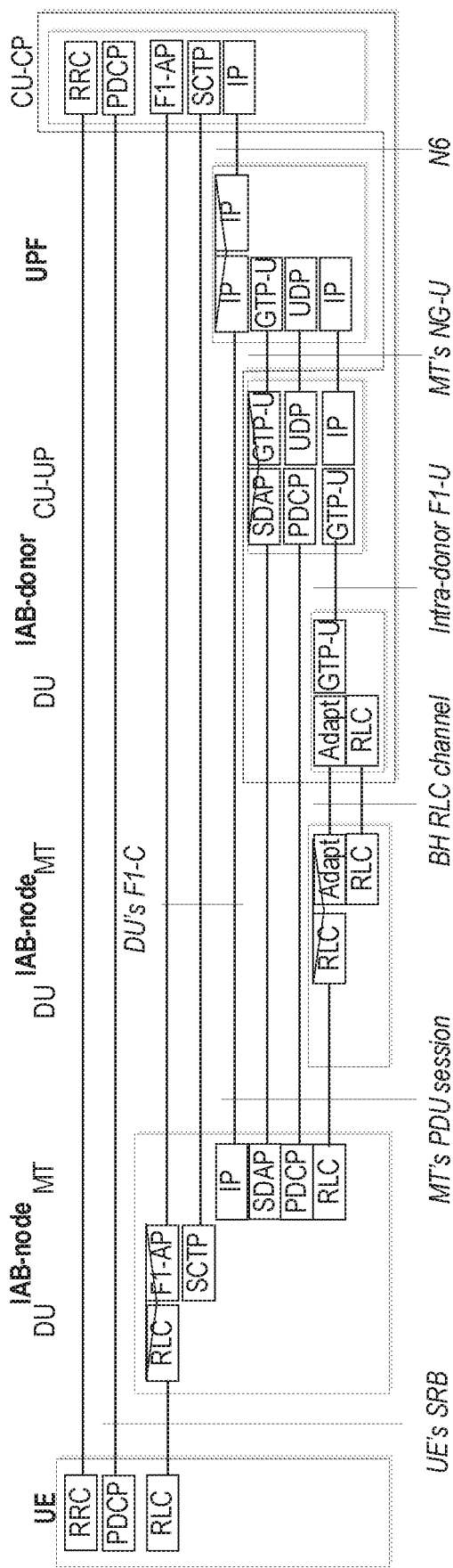
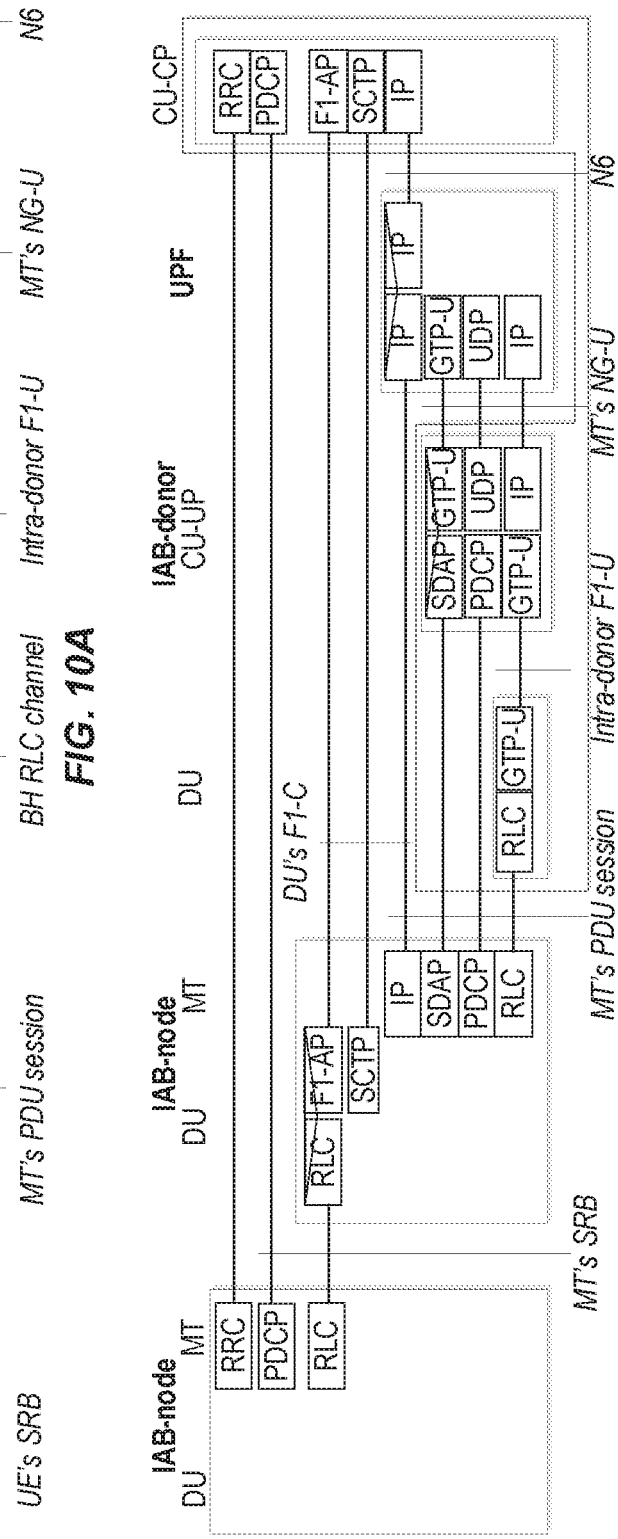
FIG. 10A
FIG. 10B

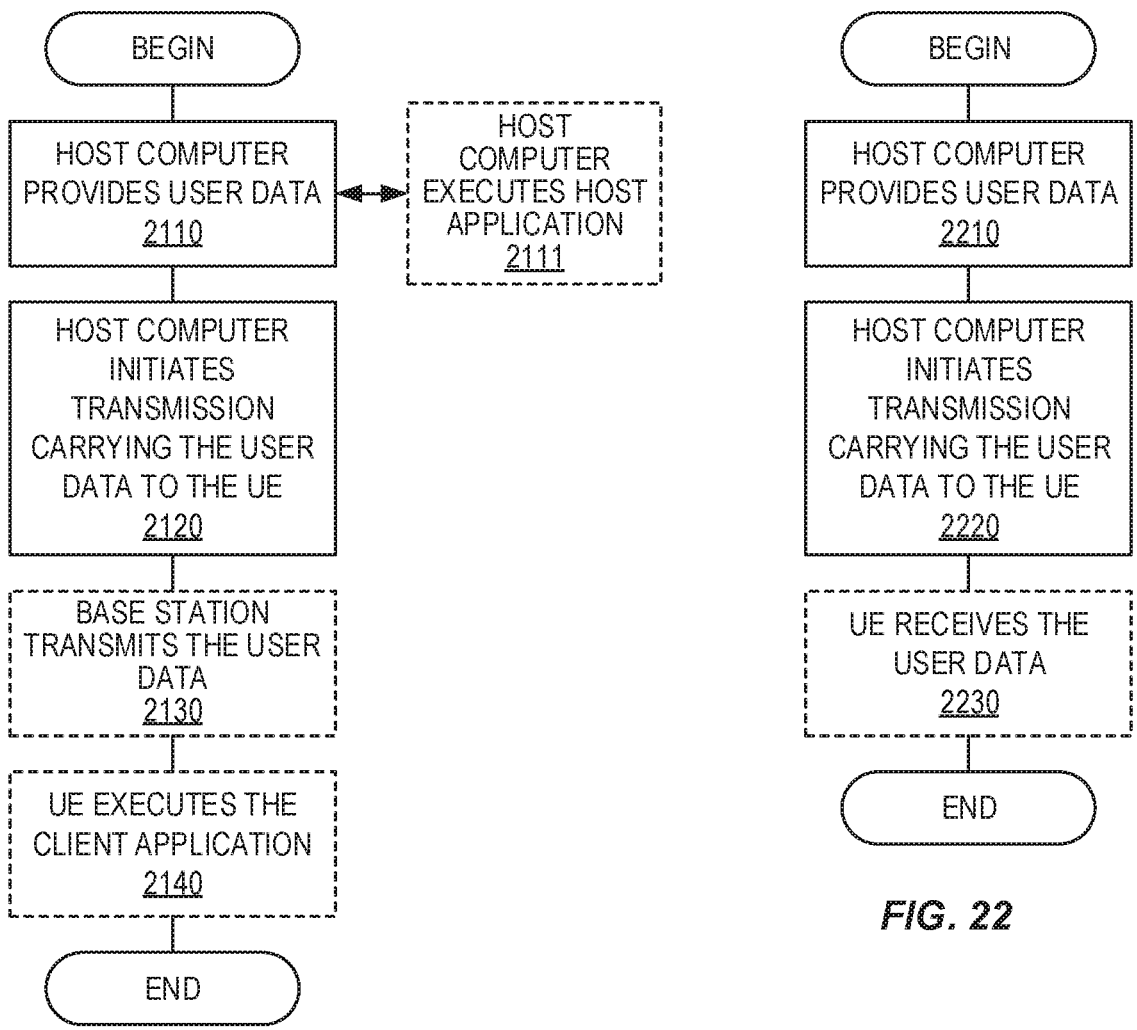

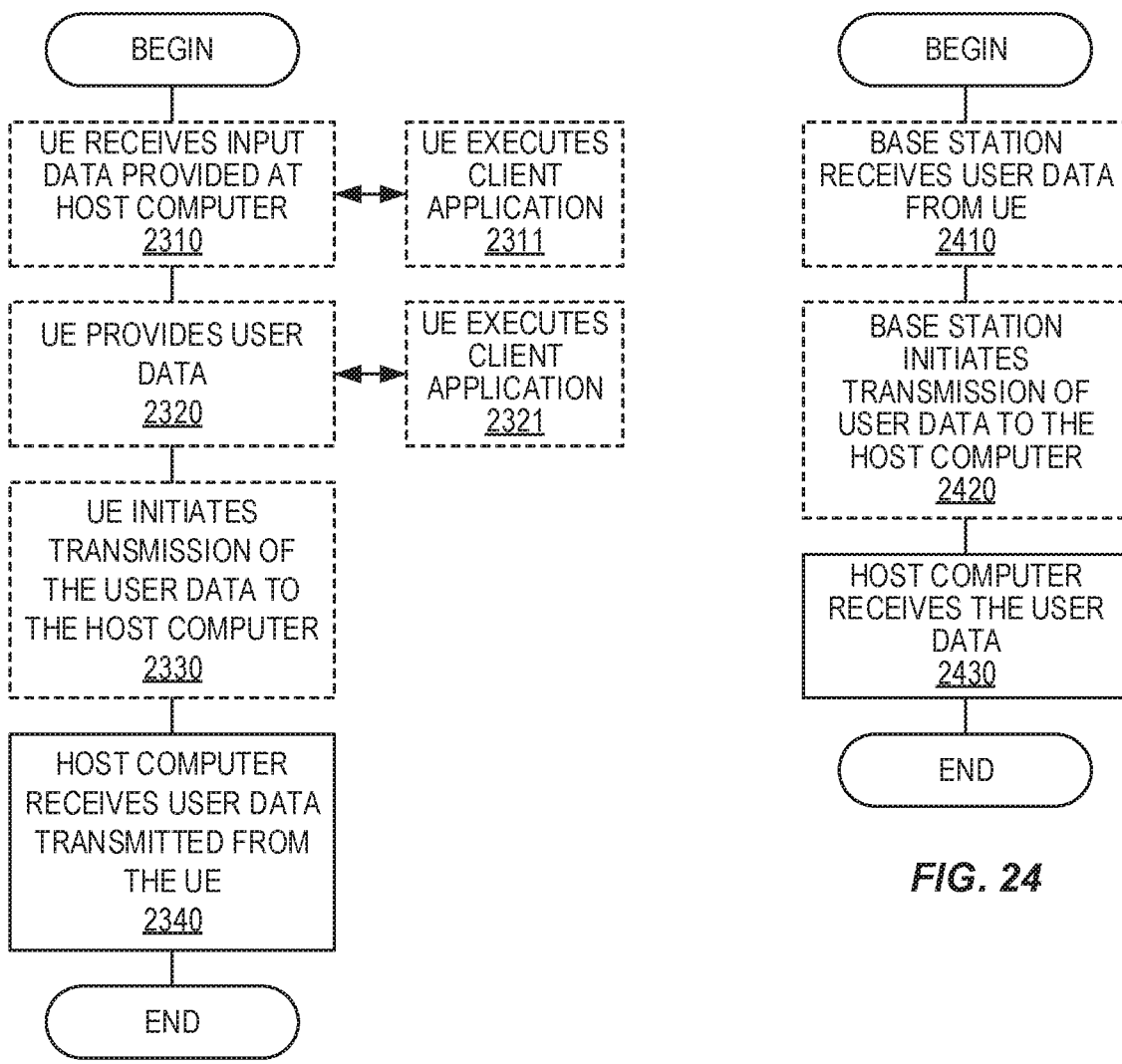

INTERNET PROTOCOL (IP) ADDRESS ASSIGNMENT IN INTEGRATED ACCESS BACKHAUL (IAB) NETWORKS

TECHNICAL FIELD

The present application relates generally to the field of wireless communication networks, and more specifically to integrated access backhaul (IAB) networks in which the available wireless communication resources are shared between user access to the network and backhaul of user traffic within the network (e.g., to/from a core network).

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

FIG. 1 illustrates a high-level view of the 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces.

Although not shown, in some deployments 5GC 198 can be replaced by an Evolved Packet Core (EPC), which conventionally has been used together with LTE E-UTRAN. In such deployments, gNBs 100, 150 can connect to one or more Mobility Management Entities (MMEs) in EPC 198 via respective S1-C interfaces. Similarly, gNBs 100, 150 can connect to one or more Serving Gateways (SGWs) in EPC via respective NG-U interfaces.

In addition, the gNBs can be connected to each other via one or more Xn interfaces, such as Xn interface 140 between gNBs 100 and 150. The radio technology for the NG-RAN is often referred to as "New Radio" (NR). With respect to the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 1 (and described in TS 38.401 and TR 38.801) include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU. Furthermore, the F1 interface between the gNB-CU and gNB-DU is specified and/or based on the following general principles:

F1 is an open interface;

F1 supports the exchange of signalling information between respective endpoints, as well as data transmission to the respective endpoints;

from a logical standpoint, F1 is a point-to-point interface between the endpoints (even in the absence of a physical direct connection between the endpoints);

F1 supports control plane (CP) and user plane (UP) separation, such that a gNB-CU may be separated in CP and UP;

F1 separates Radio Network Layer (RNL) and Transport Network Layer (TNL);

F1 enables exchange of user-equipment (UE) associated information and non-UE associated information;

F1 is defined to be future proof with respect to new requirements, services, and functions;

A gNB terminates X2, Xn, NG and S1-U interfaces and, for the F1 interface between DU and CU, utilizes the F1 application part protocol (F1-AP) which is defined in 3GPP TS 38.473.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU ican host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

It has also been agreed in 3GPP RAN3 Working Group (WG) to support a separation of the gNB-CU into a CU-CP function (including RRC and PDCP for signaling radio bearers) and CU-UP function (including PDCP for user plane). The CU-CP and CU-UP parts communicate with each other using the E1-AP protocol over the E1 interface. The CU-CP/UP separation is illustrated in FIG. 2.

Densification via the deployment of more and more base stations (e.g., macro or micro base stations) is one of the mechanisms that can be employed to satisfy the increasing demand for bandwidth and/or capacity in mobile networks, which is mainly driven by the increasing use of video streaming services. Due to the availability of more spectrum in the millimeter wave (mmw) band, deploying small cells that operate in this band is an attractive deployment option for these purposes. However, the normal approach of connecting the small cells to the operator's backhaul network with optical fiber can end up being very expensive and impractical. Employing wireless links for connecting the small cells to the operator's network is a cheaper and more practical alternative. One such approach is an integrated access backhaul (IAB) network where the operator can utilize part of the radio resources for the backhaul link.

IAB has been studied earlier in 3GPP in the scope of Long Term Evolution (LTE) Rel-10. In that work, an architecture was adopted where a Relay Node (RN) has the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node(2) on the same Donor eNB from the CN. During the Rel-10 study, other architectures were also considered including, e.g., where the RNs are more transparent to the Donor gNB and allocated a separate stand-alone P/S-GW node.

For 5G/NR, similar options utilizing IAB can also be considered. One difference compared to LTE is the gNB-CU/DU split described above, which separates time critical RLC/MAC/PHY protocols from less time critical RRC/PDCP protocols. It is anticipated that a similar split could also be applied for the IAB case. Other IAB-related differences anticipated in NR as compared to LTE are the support of multiple hops and the support of redundant paths.

FIG. 3 shows a reference diagram for an IAB network in standalone mode, as further explained in 3GPP TR 38.874. The IAB network shown in FIG. 3 includes one IAB-donor 340 and multiple IAB-nodes 311-315, all of which can be a portion of a radio access network (RAN) such as an NG-RAN. IAB donor 340 includes DUs 321, 322 connected to a CU, which is represented by functions CU-CP 331 and CU-UP 332. IAB donor 340 can communicate with core network (CN) 350 via the CU functionality shown.

Each of the IAB nodes 311-315 connects to the IAB-donor via one or more wireless backhaul links (also referred to herein as "hops"). More specifically, the Mobile-Termination (MT) function of each IAB-node 311-315 terminates the radio interface layers of the wireless backhaul towards a corresponding "upstream" DU function, e.g., either DU 321 or 322 of IAB donor 340 or a DU function of an intermediate IAB node "downstream" from IAB donor 340 (e.g., 312 in the case of 314). This MT functionality is similar to functionality that enables UEs to connect the same IAB network and, in fact, has been specified by 3GPP as part of the Mobile Equipment (ME). The DU functionality of IAB nodes 311-315 also terminates the radio interface layers toward UEs, e.g., for access to the network.

As shown in FIG. 3, IAB-donor 340 can be treated as a single logical node that comprises a set of functions such as gNB-DUs 321-322, gNBCU-CP 331, gNB-CU-UP 332, and possibly other functions. In some deployments, the IAB-donor can be split according to these functions, which can all be either co-located or non-co-located as allowed by the 3GPP NG-RAN architecture. Also, some of the functions presently associated with the IAB-donor can be moved outside of the IAB-donor if such functions do not perform IAB-specific tasks.

In addition, 3GPP TS 38.874 (version 0.2.1) specifies several reference architectures for supporting user plane traffic over IAB nodes, including IAB Donor nodes such as shown in FIG. 3. In these various alternatives, there are certain advantages in keeping a complete F1 protocol stack between an IAB node implementing DU functionality and an IAB donor implementing CU functionality. For example, standardization impacts can be reduced and/or minimized since existing F1 control plane (referred to as "F1-C") and user plane (referred to as "F1-U") functionality can be reused, which would also reduce work related to product implementation and testing. As another example, the IAB node can easily be migrated to a "normal" DU once fixed transport network connectivity is available. The reason for this is that the IAB node has full DU functionality (as mentioned above) and is seen as a DU by the IAB donor (CU). This will reduce the need to upgrade the hardware or software in the IAB node, as well the need to update the network configuration when connecting fixed transport to the IAB node.

Nevertheless, keeping a complete F1 protocol stack in this manner creates several issues and/or drawbacks. As one example, the F1 protocol stack utilizes Internet Protocol (IP) routing functionality such that IP addresses be assigned to the IAB nodes, which can create various difficulties in management of the network.

SUMMARY

Accordingly, exemplary embodiments of the present disclosure address these and other difficulties in configuration and/or management of a 5G network comprising IAB nodes, thereby enabling the otherwise-advantageous deployment of IAB solutions.

Such exemplary embodiments can include methods and/or procedures performed by an integrated access backhaul (IAB) node of a radio access network (RAN) associated with a core network (CN). The exemplary methods and/or procedures can include performing a registration with a CN node. The exemplary methods and/or procedures can also include establishing a secure connection with a RAN node. The exemplary methods and/or procedures can also include receiving, from the RAN node via the secure connection, configuration information for one or more radio bearers between the IAB node and the RAN node, wherein the radio bearers are adapted for backhaul of at least one of the following: control plane information or user plane information. The exemplary methods and/or procedures can also include establishing, with the RAN node via at least one of the radio bearers usable for backhaul, one or more Internet Protocol (IP) addresses usable by the IAB node.

Other exemplary embodiments include methods and/or procedures performed by a node, in a core network (CN) associated with a radio access network (RAN), for configuring an integrated access backhaul (IAB) node in the RAN.

The exemplary methods and/or procedures can include receiving a registration request from the IAB node. The exemplary methods and/or procedures can also include determining that the registration request pertains to the IAB node rather than a user equipment (UE). The exemplary methods and/or procedures can also include registering the IAB node, and establishing a context for the IAB node in the RAN, wherein the context includes information distinguishing the IAB node from a UE.

Other exemplary embodiments include methods and/or procedures performed by a node, in a radio access network (RAN) associated with a core network (CN), for configuring an integrated access backhaul (IAB) node in the RAN. The exemplary methods and/or procedures can include receiving, from a CN node, context information for the IAB node in the RAN, wherein the context includes information distinguishing the IAB node from a user equipment (UE). The exemplary methods and/or procedures can also include establishing a secure connection with the IAB node. The exemplary methods and/or procedures can also include sending, to the IAB node via the secure connection, configuration information for one or more radio bearers between the IAB node and the RAN node, wherein the radio bearers are adapted for backhaul of at least one of the following: control plane information, or user plane information. The exemplary methods and/or procedures can also include establishing, with the IAB node via at least one of the radio bearers, one or more Internet Protocol (IP) addresses usable by the IAB node.

Exemplary embodiments also include IAB nodes (or components thereof), CN nodes (e.g., AMF, UPF, MME, SGW, or combination thereof), or RAN nodes (e.g., base station, eNB, gNB, ng-eNB, en-gNB, etc. or component therof) configured to perform operations corresponding to exemplary methods and/or procedures described herein. Exemplary embodiments also include non-transitory, computer-readable media storing computer-executable instructions that, when executed by a processor of an IAB node, a CN node, or a RAN node, configure the node to perform operations corresponding to exemplary methods and/or procedures described herein.

These and other exemplary embodiments provide various advantages, including facilitating the use of a complete F1 stack towards the IAB node, without requiring that the CN's involvement in the IAB node's IP address assignment and the routing in the IAB donor DU function. This minimizes the overall network impacts of introducing IAB nodes, which reduces the cost associated with management, configuration, upgrades, etc. Moreover, such embodiments also facilitate advantageous deployment of IAB nodes even before an operator has a full-fledged 5G Core network.

BRIEF DESCRIPTION OF THE DRAWINGS

FIGS. 10A-C show exemplary UE RRC, MT RRC, and DU F1-AP protocol stacks for an alternative for architecture "1b".

FIGS. 21-24 are flow diagrams of exemplary methods and/or procedures for transmission and/or reception of user data that can be implemented, for example, in the exemplary communication systems and/or networks illustrated in FIGS. 19-20.

DETAILED DESCRIPTION

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

As briefly mentioned above, in the various reference architectures for supporting user plane traffic over IAB nodes that are specified in 3GPP TS 38.874 (version 0.2.1), there are certain advantages in keeping a complete F1 protocol stack between an IAB node implementing DU functionality and an IAB donor implementing CU functionality. Nevertheless, keeping a complete F1 protocol stack in this manner creates several issues and/or drawbacks. As one example, the F1 protocol stack utilizes Internet Protocol (IP) routing functionality such that IP addresses be assigned to the IAB nodes, which can create various difficulties in management of the network. These issues and/or drawbacks are discussed in more detail below.

Figure 1:
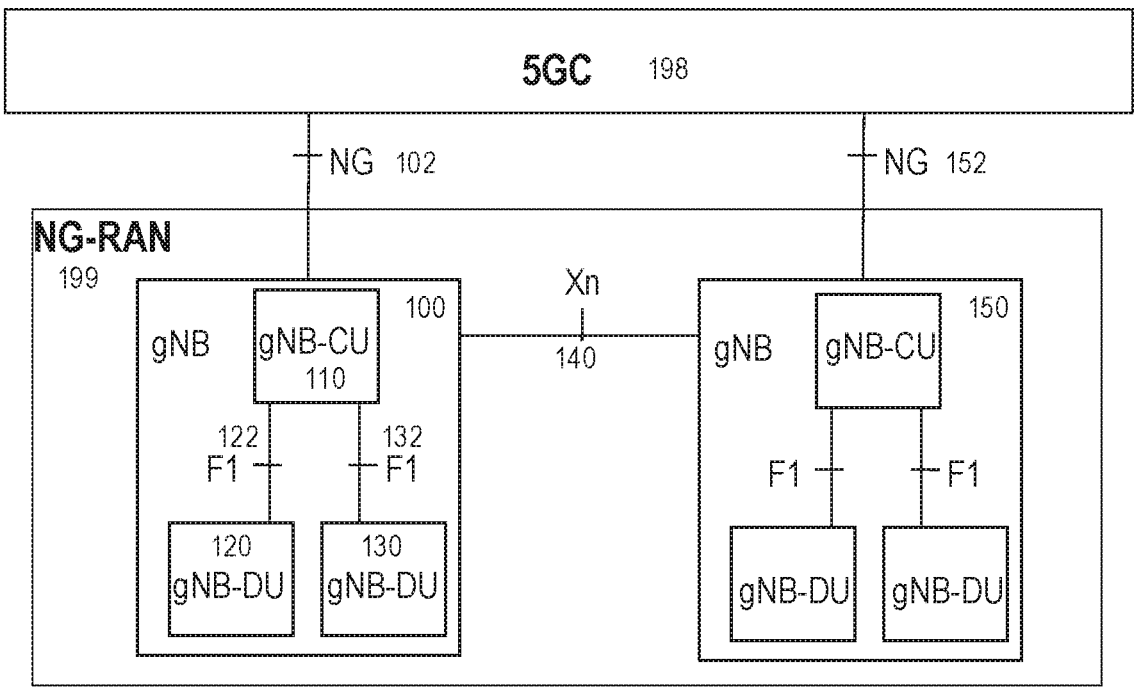
FIG. 1 illustrates a high-level view of the 5G network architecture, including a Next Generation radio access network (NG-RAN) and a 5G core (5GC) network.
Figure 2:
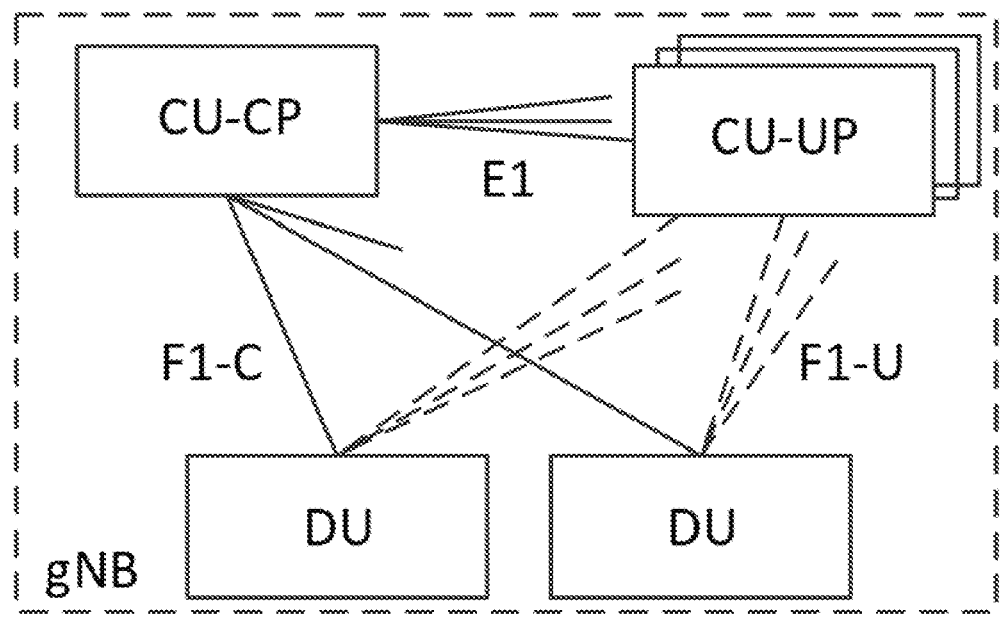
FIG. 2 illustrates interfaces within an NG-RAN node (e.g., gNB) that support control plane (CP) and user plane (UP) functionality.
Figure 3:
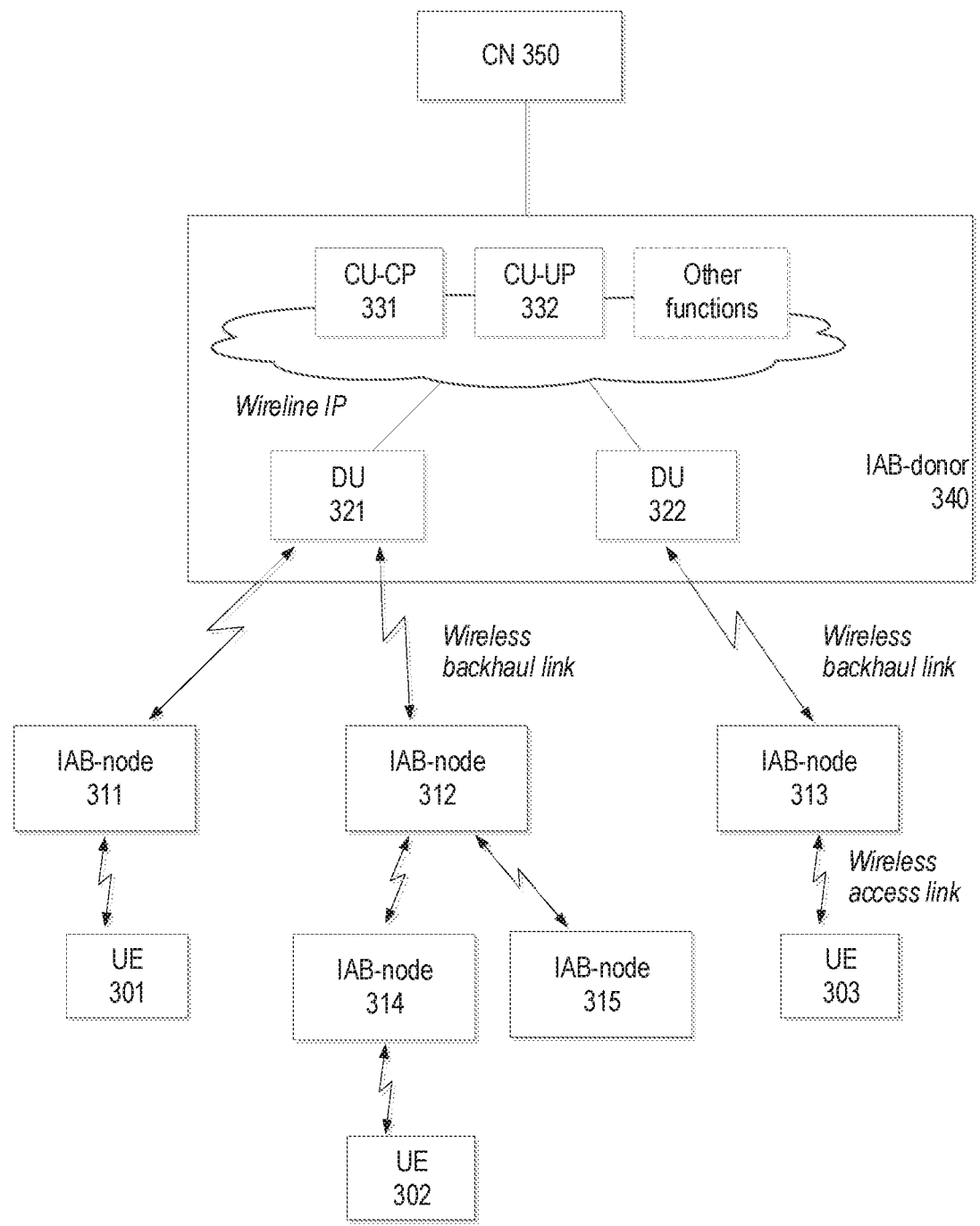
FIG. 3 shows a reference diagram for an integrated access backhaul (IAB) network in standalone mode, as further explained in 3GPP TR 38.874.
Figure 4:
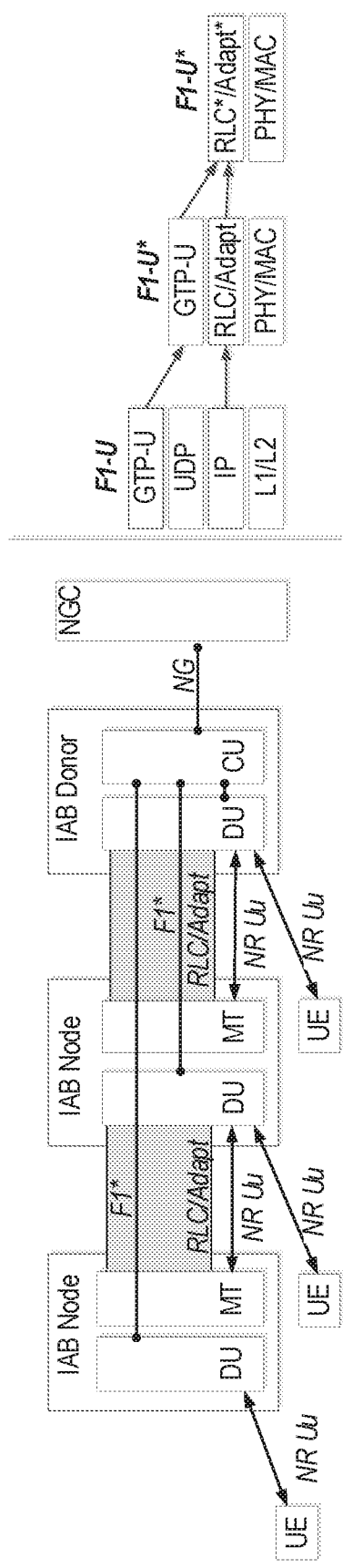
FIGS. 4-5 show block diagrams of two different IAB reference architectures, i.e., architectures "1a" and "1b" as specified in 3GPP TS 38.874 (version 0.2.1).

FIG. 4 shows a block diagram of an IAB reference architecture "1a" as specified in 3GPP TS 38.874 (version 0.2.1), which leverages the CU/DU split architecture in a two-hop chain of IAB nodes underneath an IAB-donor. In this architecture, each IAB node holds a DU and an MT. Via the MT, the IAB-node connects to an upstream IAB-node or the IAB-donor. Via the DU, the IAB-node establishes RLC-channels to UEs and to MTs of downstream IAB-nodes. For MTs, this RLC-channel may refer to a modified RLC*. Whether an IAB node can connect to more than one upstream IAB-node or IAB-donor is for further study.

The IAB Donor also includes a DU to support UEs and MTs of downstream IAB nodes. The IAB-donor holds a CU for the DUs of all IAB-nodes and for its own DU. It is FFS if different CUs can serve the DUs of the IAB-nodes. Each DU on an IAB-node connects to the CU in the IAB-donor using a modified form of F1, which is referred to as F1*. F1*-U runs over RLC channels on the wireless backhaul between the MT on the serving IAB-node and the DU on the donor. F1*-U transport between MT and DU on the serving IAB-node as well as between DU and CU on the donor is for further study. An adaptation layer is added, which holds routing information, enabling hop-by-hop forwarding. It replaces the IP functionality of the standard F1-stack. F1*-U may carry a GTP-U header for the end-to-end association between CU and DU. In a further enhancement, information carried inside the GTP-U header may be included into the adaption layer. Further, optimizations to RLC may be considered such as applying ARQ only on the end-to-end connection opposed to hop-by-hop.

The right side of FIG. 4 shows two examples of such F1*-U protocol stacks. In this figure, enhancements of RLC are referred to as RLC*. The MT of each IAB-node further sustains NAS connectivity to the NGC, e.g., for authentication of the IAB-node. It further sustains a PDU-session via the NGC, e.g., to provide the IAB-node with connectivity to the OAM. Details of F1*, the adaptation layer, RLC*, hop-by-hop forwarding, and transport of F1-AP are for further study. Protocol translation between F1* and F1 in case the IAB-donor is split is also for further study.

Figure 5:
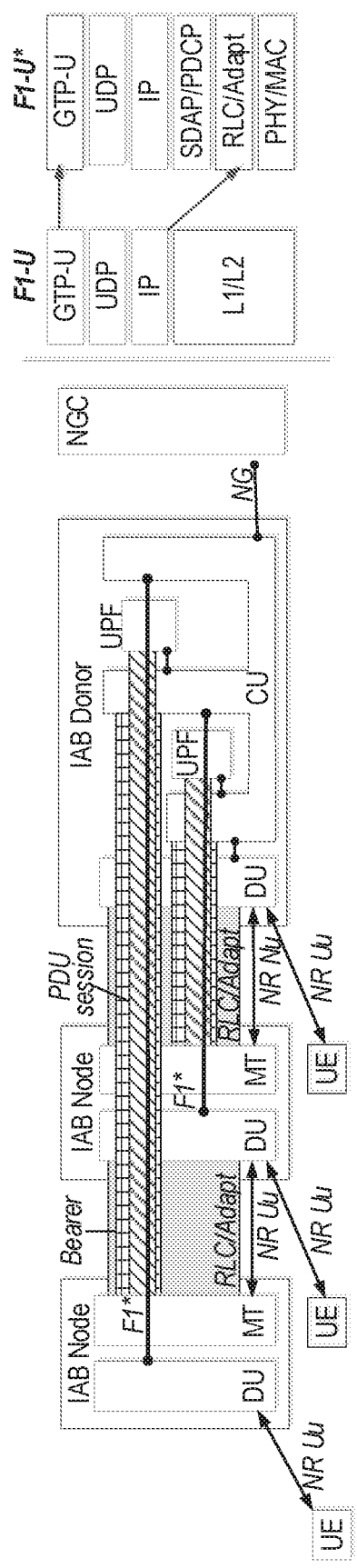

FIG. 5 shows a block diagram of an IAB reference architecture "1b" as specified in 3GPP TS 38.874 (version 0.2.1), which also leverages the CU/DU split architecture in a two-hop chain of IAB nodes underneath an IAB-donor. The IAB-donor holds only one logical CU.

In this architecture, each IAB-node and the IAB-donor hold the same functions as in architecture 1a. Also, as in architecture 1a, every backhaul link establishes an RLC-channel, and an adaptation layer is inserted to enable hop-by-hop forwarding of F1*.

In architecture 1b, however, the MT on each IAB-node establishes a PDU-session with a UPF residing on the donor. The MT's PDU-session carries F1* for the collocated DU. In this manner, the PDU-session provides a point-to-point link between CU and DU. On intermediate hops, the PDCP-PDUs of F1* are forwarded via an adaptation layer in the same manner as described for architecture 1a. The right side of FIG. 5 shows an example of the F1*-U protocol stack.

Referring again to architecture 1a shown in FIG. 4, user plane (UP) and control-plane (CP, e.g., RRC) traffic can be protected via PDCP over the wireless backhaul. A mechanism is also needed for protecting F1-AP traffic over the wireless backhaul. Four alternatives are shown in FIGS. 6-9 below.

Figure 6A:
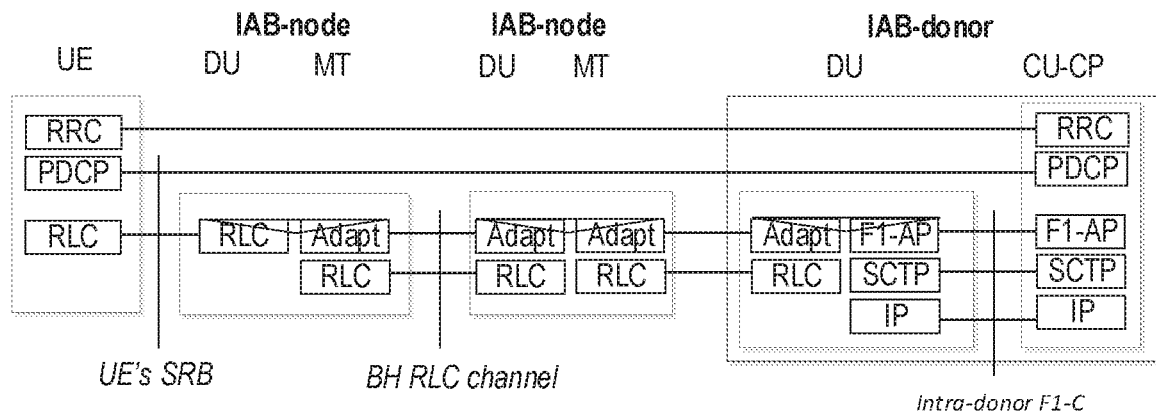
FIGS. 6A-C show exemplary user equipment (UE) radio resource control (RRC), mobile terminal (MT) RRC, and distributed unit (DU) F1-AP protocol stacks, respectively, for a first alternative for architecture "1a" (also referred to as "alternative 1").
Figure 6B:
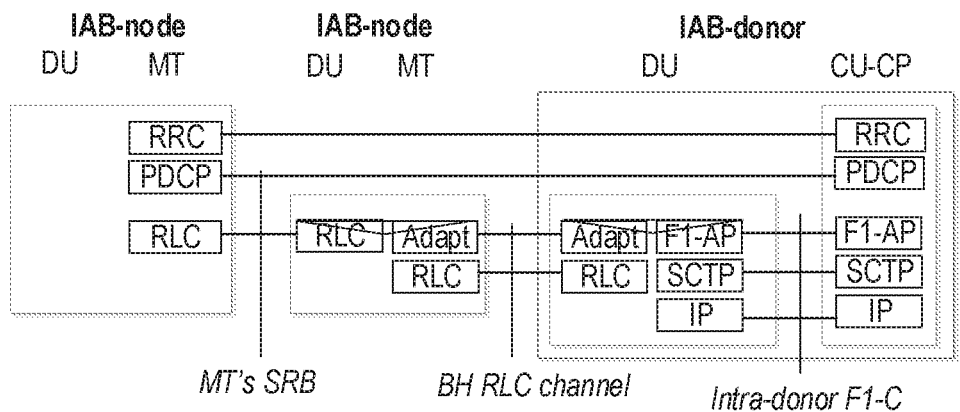
Figure 6C:
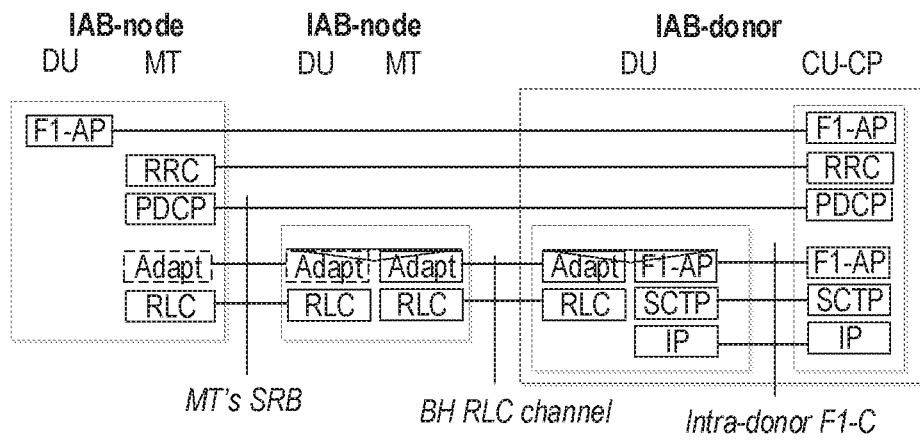

FIGS. 6A-C show exemplary UE RRC, MT RRC, and DU F1-AP protocol stacks for a first alternative for architecture 1a, also referred to as "alternative 1". In this alternative, the adaptation layer is placed on top of RLC, and RRC connections for UE RRC and MT RRC are carried over a signalling radio bearer (SRB). On the UE's or MT's access link, the SRB uses an RLC-channel; whether the RLC channel has an adaptation layer is for further study.

On the wireless backhaul links, the SRB's PDCP layer is carried over RLC-channels with adaptation layer. The adaptation layer placement in the RLC channel is the same for CP as for UP. The information carried on the adaptation layer may be different for SRB than for data radio bearer (DRB). The DU's F1-AP is encapsulated in RRC of the collocated MT. F1-AP is therefore protected by the PDCP of the underlying SRB. Within the IAB-donor, the baseline is to use native F1-C stack.

Figure 7A:
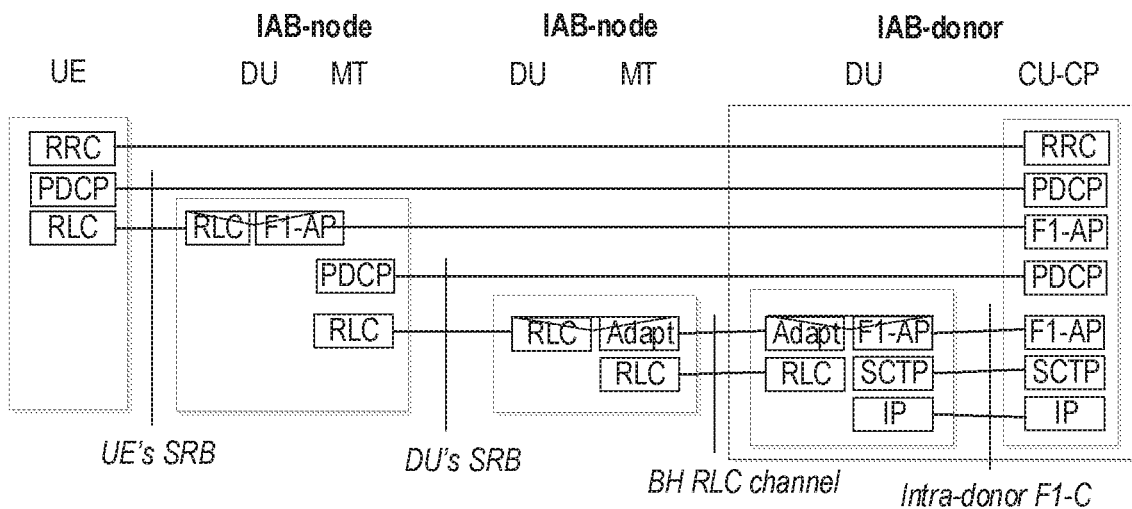
FIGS. 7A-C show exemplary UE RRC, MT RRC, and DU F1-AP protocol stacks, respectively, for a second alternative for architecture "1a" (also referred to as "alternative 2").
Figure 7B:
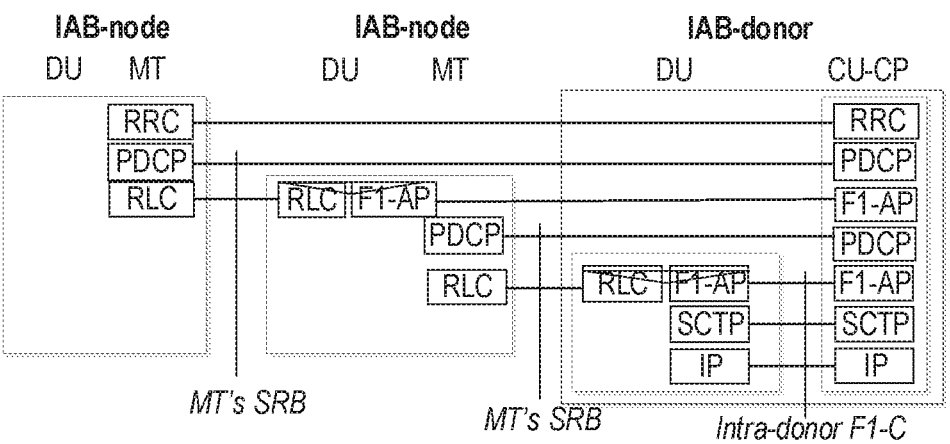
Figure 7C:
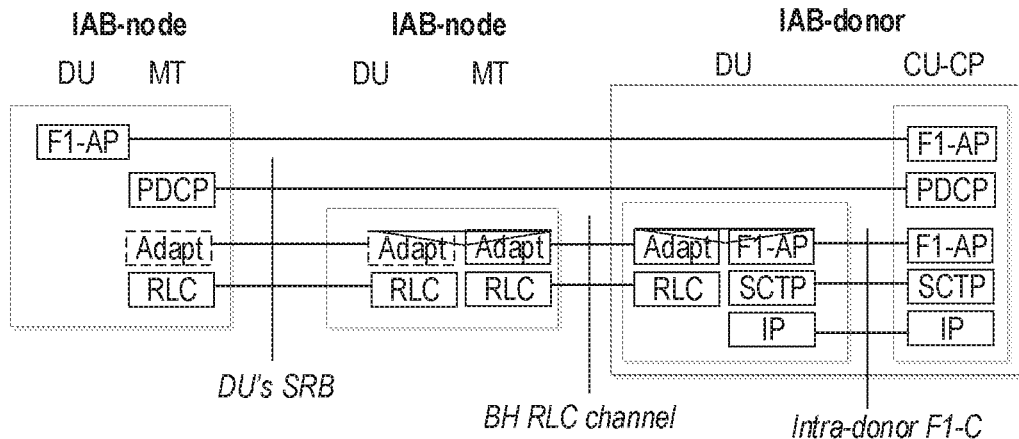

FIGS. 7A-C show exemplary UE RRC, MT RRC, and DU F1-AP protocol stacks for a second alternative for architecture 1a, also referred to as "alternative 2". Similar to alternative 1, RRC connections for UE RRC and MT RRC are carried over a signalling radio bearer (SRB), and the SRB uses an RLC-channel on the UE's or MT's access link.

In contrast, on the wireless backhaul links, the SRB's PDCP layer is encapsulated into F1-AP. The DU's F1-AP is carried over an SRB of the collocated MT. F1-AP is protected by this SRB's PDCP. On the wireless backhaul links, the PDCP of the F1-AP's SRB is carried over RLC-channels with adaptation layer. The adaptation layer placement in the RLC channel is the same for CP as for UP. The information carried on the adaptation layer may be different for SRB than for DRB. Within the IAB-donor, the baseline is to use native F1-C stack.

Figure 8A:
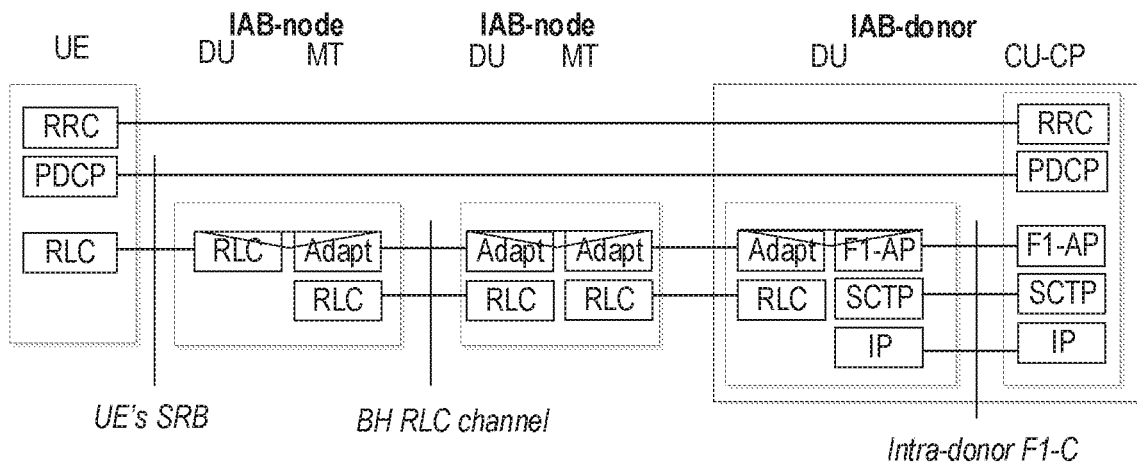
FIGS. 8A-C show exemplary UE RRC, MT RRC, and DU F1-AP protocol stacks, respectively, for a third alternative for architecture "1a" (also referred to as "alternative 3").
Figure 8B:
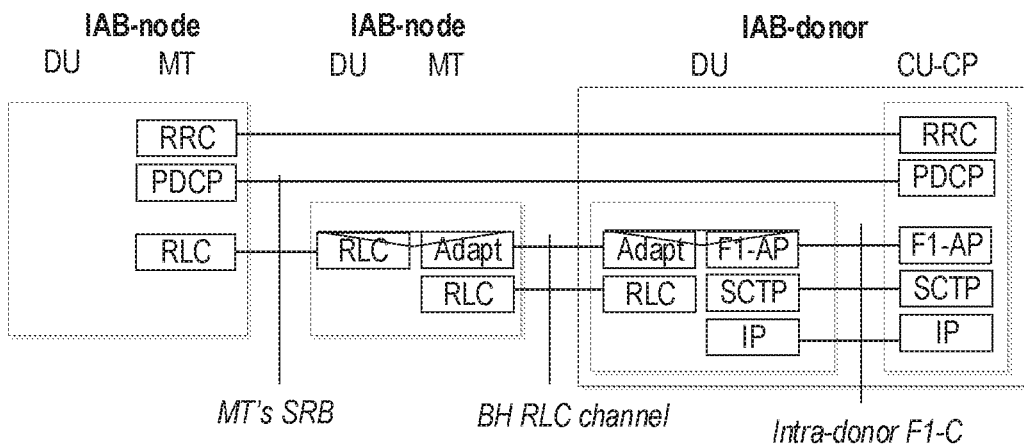
Figure 8C:
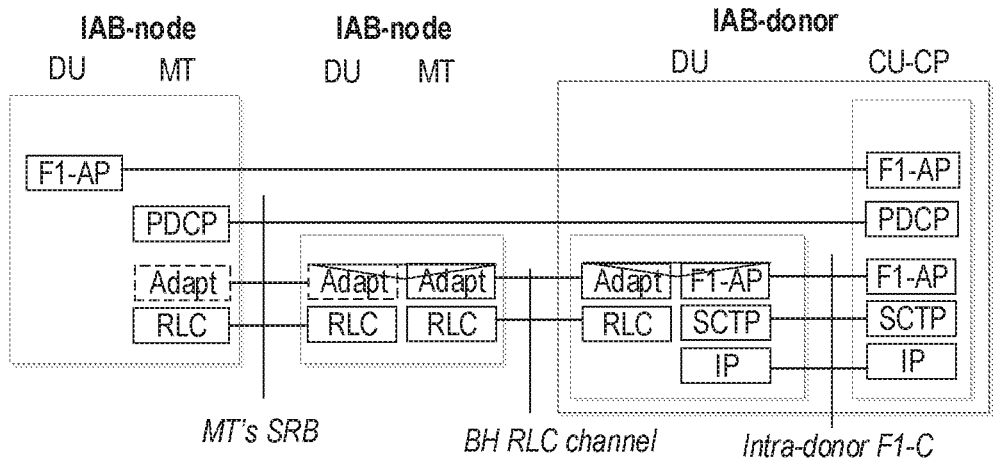

FIGS. 8A-C show exemplary UE RRC, MT RRC, and DU F1-AP protocol stacks for a third alternative for architecture 1a, also referred to as "alternative 3". In this alternative, the adaptation layer is placed on top of RLC, and RRC connections for UE and MT are carried over a signalling radio bearer (SRB). On the UE's or MT's access link, the SRB uses an RLC-channel; whether the RLC channel has an adaptation layer is for further study.

On the wireless backhaul links, the SRB's PDCP layer is carried over RLC-channels with adaptation layer. The adaptation layer placement in the RLC channel is the same for CP as for UP. The information carried on the adaptation layer may be different for SRB than for data radio bearer (DRB). The DU's F1-AP is also carried over an SRB of the collocated MT. F1-AP is therefore protected by the PDCP of this SRB. On the wireless backhaul links, the PDCP of the this SRB is also carried over RLC-channels with adaptation layer. Within the IAB-donor, the baseline is to use native F1-C stack.

Figure 9A:
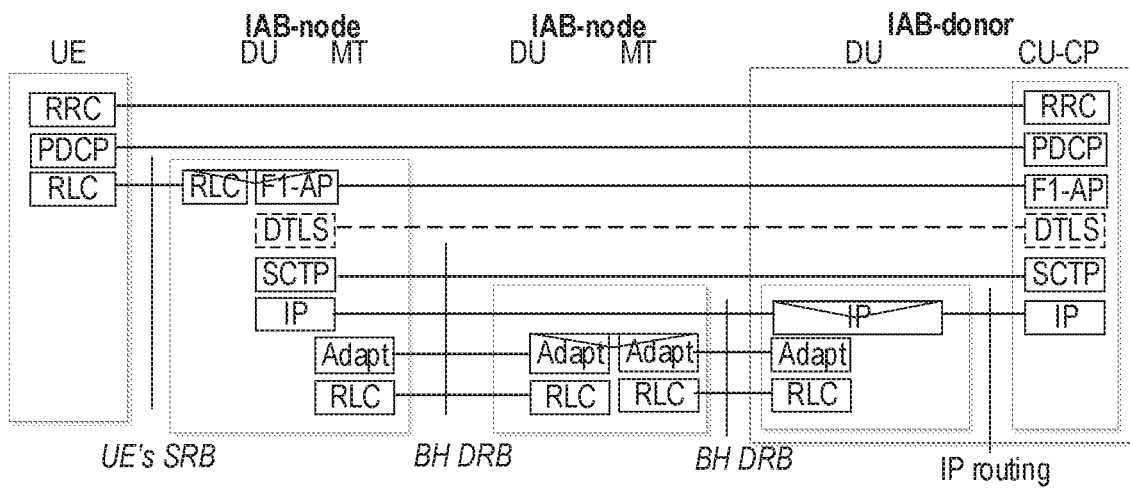
FIGS. 9A-C show exemplary UE RRC, MT RRC, and DU F1-AP protocol stacks, respectively, for a fourth alternative for architecture "1a" (also referred to as "alternative 4").
Figure 9B:
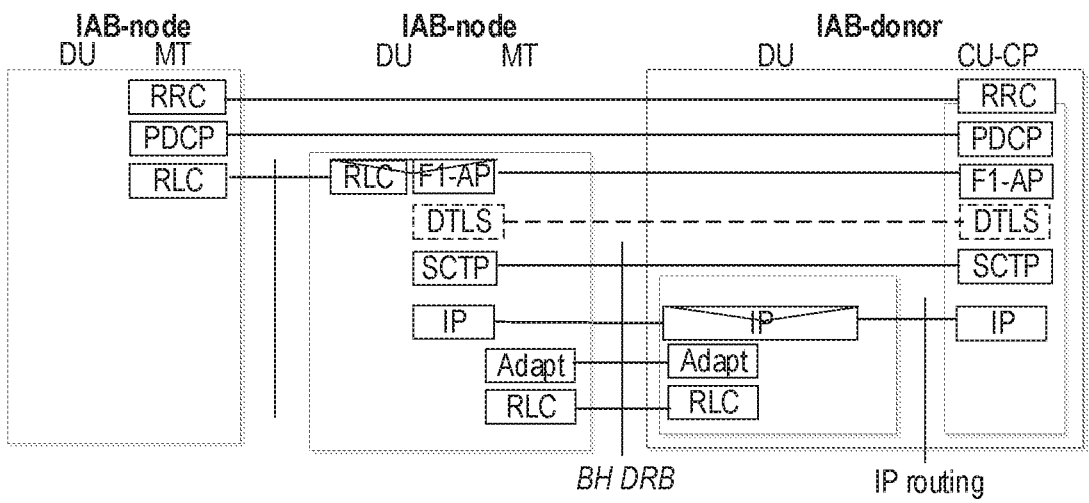
Figure 9C:
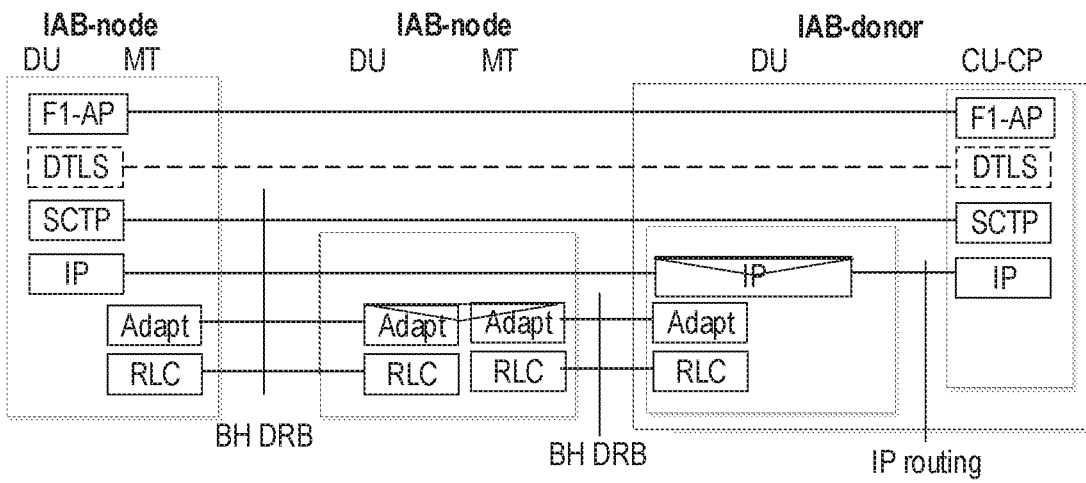

FIGS. 9A-C show exemplary UE RRC, MT RRC, and DU F1-AP protocol stacks for a fourth alternative for architecture 1a, also referred to as "alternative 4". In this alternative, the adaptation layer is placed on top of RLC, and all F1-AP signalling is carried over SCTP/IP to the target node. The IAB-donor maps DL packets based on target node IP to adaptation layer used on backhaul DRB. Separate backhaul DRBs can be used to carry F1-AP signalling from F1-U related content. For example, mapping to backhaul DRBs can be based on target node IP address and IP layer Diffserv Code Points (DSCP) supported over F1 as specified in 3GPP TS 38.474.

In alternative 4, a DU can also forward other IP traffic to the IAB node (e.g., OAM interfaces). The IAB node terminates the same interfaces as a normal DU except that the L2/L1 protocols are replaced by adaptation/RLC/MAC/PHY-layer protocols. F1-AP and other signalling are protected using NDS (e.g., IPSec, DTLS over SCTP) operating in the conventional way between DU and CU. For example, SA3 has recently adopted the usage of DTLS over SCTP (as specified in IETF RFC6083) for protecting F1-AP.

Figure 10C:
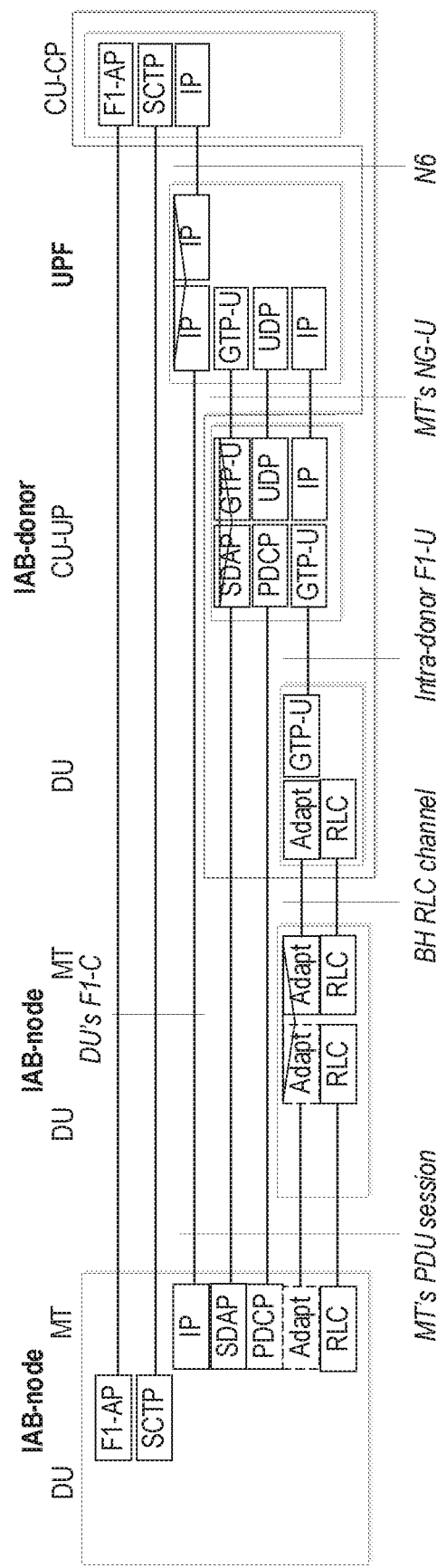

FIGS. 10A-C show exemplary UE RRC, MT RRC, and DU F1-AP protocol stacks for a mechanism for protecting F1-AP traffic over the wireless backhaul in architecture 1b, shown in FIG. 5. As discussed above for architecture 1a, the UE's or MT's RRC is carried over SRB. On the wireless backhaul, this SRB's PDCP is carried over native F1-C, with the DUs on IAB-node and IAB-donor using their native F1-C stacks. Over the wireless backhaul links, the IP-layer of this native F1-C stack is provided by a PDU-session. This PDU-session is established between the MT collocated with the DU and a UPF. The PDU-session is carried by a DRB between the MT and the CU-UP. Between CU-UP and UPF, the PDU-session is carried via NG-U. IP transport between UPF and CU-CP is provided by the PDU-session's DN. The baseline assumption is that this transport is protected. In the exemplary alternative shown in FIG. 10, the adaptation layer carrying the DRB's PDCP resides on top of RLC.

In the architectural alternatives discussed above, there are advantages with keeping a complete F1 protocol stack between an IAB node implementing DU functionality and an IAB donor implementing CU functionality. For example, standardization impacts can be reduced and/or minimized since existing F1 control and user plane functionality can be reused, which would also reduce work related to product implementation and testing. As another example, the IAB node can easily be migrated to a "normal" DU once fixed transport network connectivity is available. The reason for this is that the IAB node has full DU functionality and is seen as a DU by the IAB donor (CU). This will reduce the need to upgrade the HW or SW in the IAB node, as well reducing the need to update the network configuration when connecting fixed transport to the IAB node.

Nevertheless, keeping a complete F1 protocol stack in this manner requires that for F1-C (control), F1-AP/SCTP/IP protocols must be supported all the way between the IAB node and the IAB donor CU function as illustrated in the FIG. 9. Moreover, for F1-U, it means that GTP-U/UDP/IP must be supported between the IAB node and the IAB donor CU. In turn, these requirements imply that IP addresses be assigned to the IAB nodes.

One way to support this functionality is to support IP routing functionality in the gNB-DU as also illustrated in FIG. 8. A resulting problem is a need to assign IP address(es) to the IAB nodes, as well as update the routing functionality in the gNB-DU so that the gNB-DU will route certain packets addressed to the IP address of the IAB nodes to the correct wireless link, as well assigning the right address in the adaptation layer between the gNB-DU and the next IAB node.

Currently in a 3GPP system, the end users (UEs) get their IP addresses assigned by the core network (e.g., EPC for LTE/E-UTRAN, 5GC for NR/NG-RAN). For various reasons, however, this method is not very suitable for IAB nodes. First, the IP address (e.g. IPv4, IPv6) that the IAB nodes use are internal to the operator network, while typically the IP address assigned by the core network (CN) are towards external data networks.

Second, the IP address assigned to the IAB nodes need to be known by the DU and may also, depending on solution, need to have the same prefix as the DU's own IP addresses. If the IP address would be assigned by the CN, the CN would need to know the IP prefix of the DU (which it normally does not), and would also need to have a way to convey the address to the DU, which is currently not available.

Third, IAB nodes are RAN-internal nodes. As such, from operation and management point of view, it makes sense to minimize the visibility of these nodes in the CN. In other words, the less CN functionalities that need to be updated or be aware of IAB nodes, the less management, implementation issues, etc. are generated, which in turn reduces cost of deploying IAB nodes.

Exemplary embodiments of the present disclosure address these and other problems, challenges, and/or issues by providing methods and/or procedures for assigning IP addresses to IAB nodes at the RAN level instead of at the Core Network (CN) level, as well as methods and/or procedures for managing the IP routing functionality of the IAB-donor DU function. These exemplary embodiments provide various advantages, including facilitating the use of a complete F1 stack towards the IAB node, without requiring that the CN's involvement in the IAB node's IP address assignment and the routing in the IAB donor DU function. This minimizes the overall network impacts of introducing IAB nodes, which reduces the cost associated with management, configuration, upgrades, etc. Moreover, such embodiments also facilitate operator deployment IAB nodes even before they have a full-fledged 5G Core network.

Figure 11A:
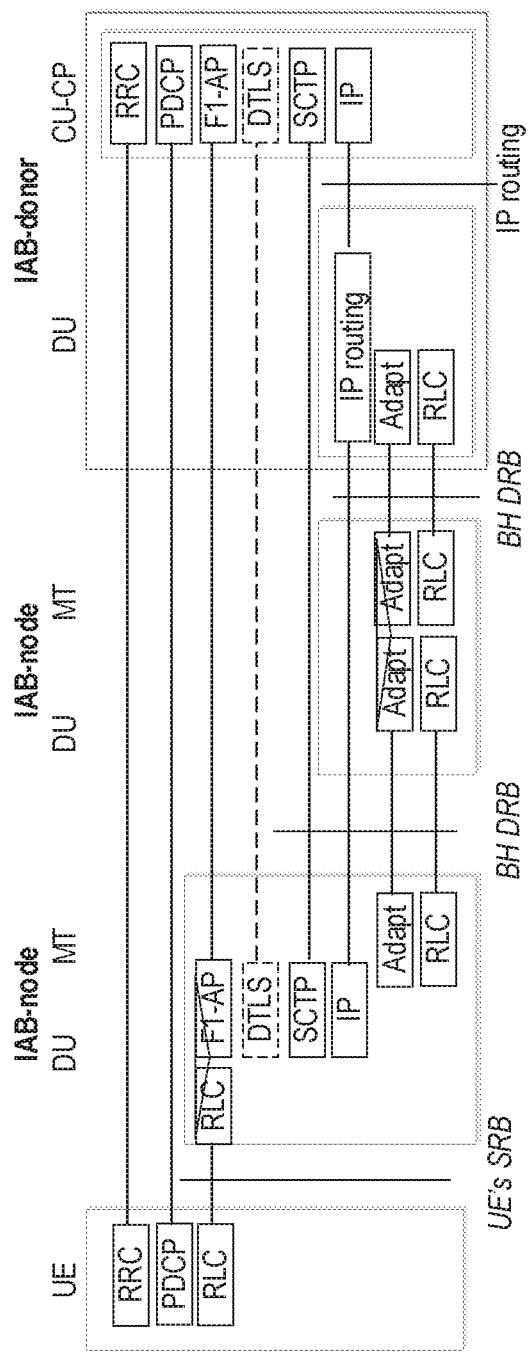
FIGS. 11A-D show various IAB-related protocol stacks according to exemplary embodiments of the present disclosure.
Figure 11B:
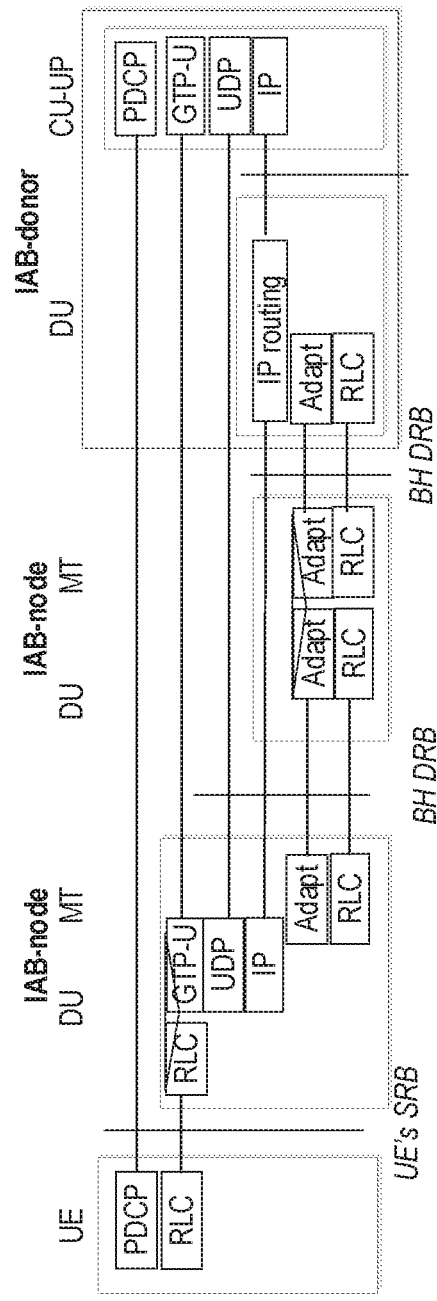
Figure 11C:
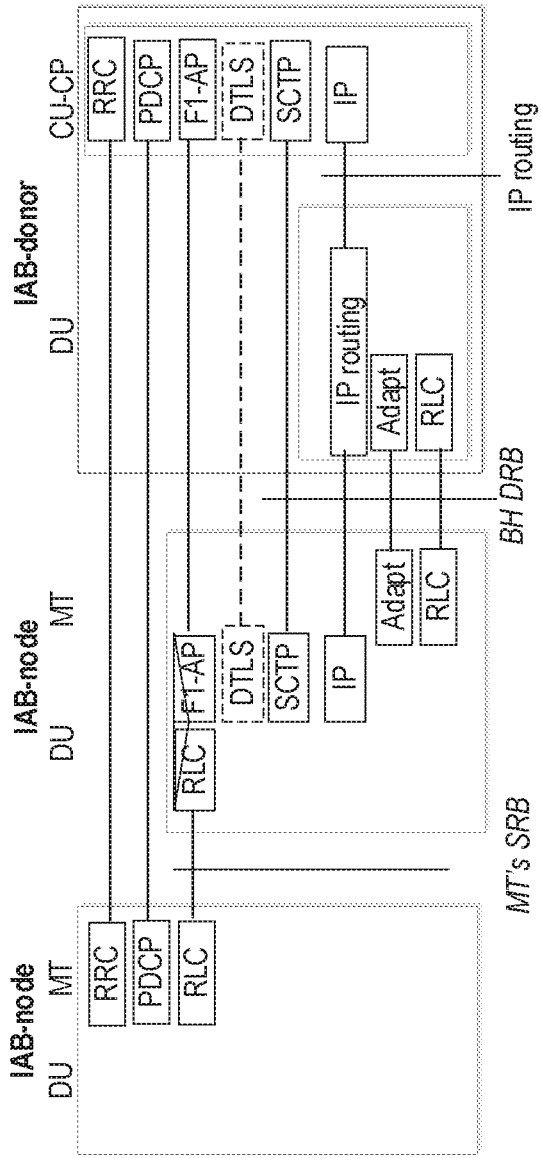
Figure 11D:
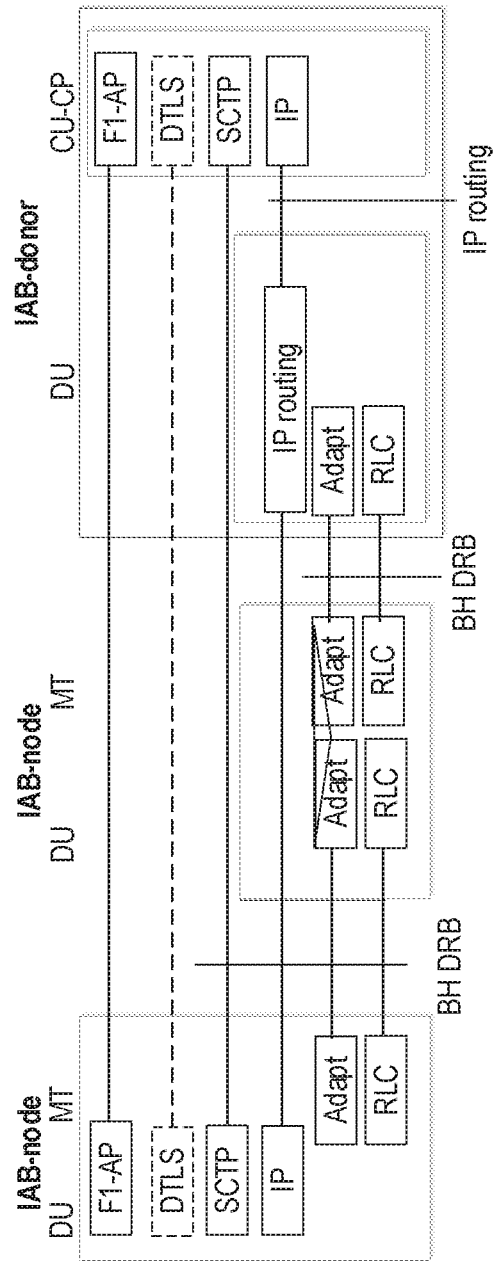

Exemplary embodiments of the present disclosure facilitate IP-based communication all the way between a CU and an IAB node. In this manner, all F1 traffic—both UP/data and CP/signalling—can be supported in a similar way. FIG. 11A-D show various IAB-related protocol stacks according to exemplary embodiments of the present disclosure. More specifically, FIG. 11A shows an exemplary protocol stack for handling of RRC (CP) traffic between a UE and IAB-donor; FIG. 11A shows an exemplary protocol stack for handling of data (UP) traffic between a UE and IAB-donor; FIG. 11C shows an exemplary protocol stack for handling of RRC traffic between an IAB node and IAB-donor; and FIG. 11D shows an exemplary protocol stack for handling of F1-AP signaling between an IAB node and an IAB-donor.

Furthermore, exemplary embodiments of the present disclosure can provide the following features, characteristics, and/or benefits:

All F1 traffic (F1-AP, user plane) is carried over IP to the target node;

The IAB-donor maps downlink (DL) packets based on target node IP to adaptation layer used on backhaul DRB;

Separate backhaul DRBs can be used to carry F1-AP signalling from F1-U related content, e.g., the mapping to BH DRBs can be based on target node IP address and IP layer Diffserv Code Points (DSCP) supported over F1 as specified in TS 38.474;

The DU can also forward other IP traffic to the IAB node (e.g., OAM interfaces);

The IAB can terminate the same interfaces as a normal DU except that the L2/L1 protocols are replaced by adapt/RLC/MAC/PHY protocols; and F1-AP and other signalling can be protected using NDS (e.g., IPSec, DTLS over SCTP) operating in the same way as between DU and CU today.

Although various exemplary embodiments are described based on assigning the IAB node one IP address, in certain embodiments the IAB node can be assigned multiple IP addresses. For example, different IP addresses can be associated with different backhaul bearers or even different QoS classes (e.g., for different end user data).

In some embodiments, IAB nodes can connect to a 5G CN (5GC) or LTE CN (EPC) to perform initial registration, but do not setup any PDU sessions to any data networks. In these embodiments, the 5GC/EPC functions are only used for performing initial authentication, subscription management, and security key generation. Special indications can be introduced in signalling between IAB node and 5GC node (e.g., AMF) or EPC node (e.g., MME), and/or within internal 5GC/EPC signaling (e.g., between AMF/MME and subscription database). Such indications can enable the AMF/MME node or other 5GC/EPC nodes to see that a "UE" that is connecting to an IAB node. Based on this indication, the 5GC node or EPC node can trigger the transition to CN Connected/RRC Connected state for the IAB node even if no PDU session (or Packed Data connection) has been set up.

Figure 12:
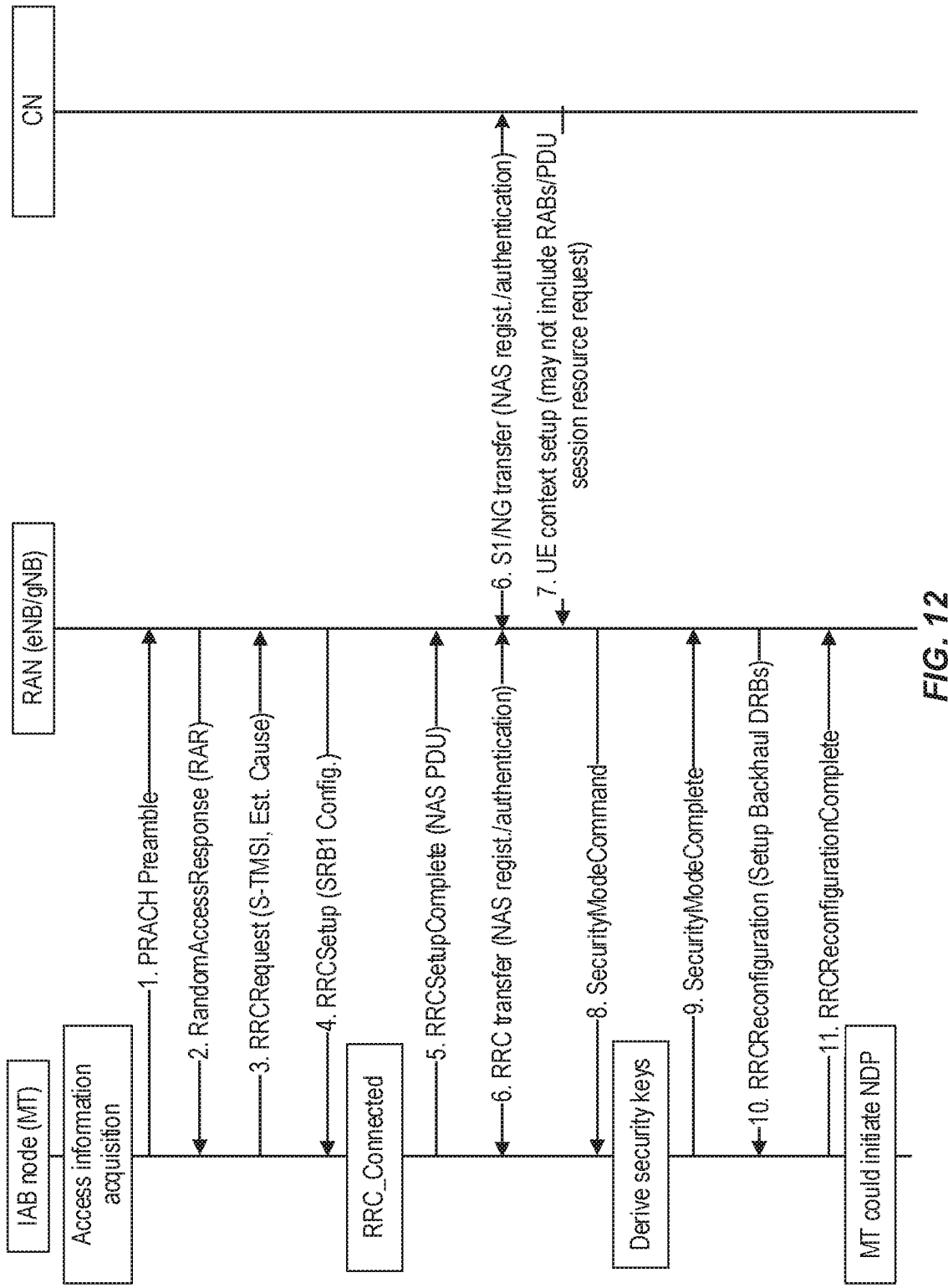
FIG. 12 shows an exemplary signaling flow of an IAB node attaching and/or registering to a CN (e.g., EPC or 5GC) without establishing a PDU session, PDP context, and/or resources for a PDU session and/or PDP context, according to exemplary embodiments of the present disclosure.

FIG. 12 shows an exemplary signaling flow of an IAB node attaching and/or registering to a CN (e.g., EPC or 5GC) without establishing a PDU session, PDP context, and/or resources for a PDU session and/or PDP context, according to exemplary embodiments of the present disclosure.

Initially, the IAB node acquires access information from a gNB (NR) or eNB (LTE). As illustrated in FIG. 12, "IAB Node (MT)" means that the IAB node is acting as a mobile terminal (MT), i.e., it is not yet active as a base station. Subsequently, the IAB node performs a random-access procedure to establish a communication channel with the gNB or eNB. As shown in the figure, this includes transmitting a PRACH preamble (operation 1) and receiving a Random Access Response from the gNB or eNB (operation 2).

Subsequently, the IAB node establishes an RRC connection to be able to send Non Access Stratum (NAS) signaling towards the CN. This can include sending an RRCRequest to gNB or eNB (operation 3), receiving an RRCSetup message with an SRB configuration (operation 4), transitioning into RRC_CONNECTED state, and responding with an RRCSetupComplete message (operation 5).

Subsequently, in operation 6, the IAB node can register with and authenticate itself to the CN (e.g., with an AMF in a 5GC or with a MME in an EPC). The signaling in operation 6 could be similar to what normal UEs perform with the exception that no PDP connection or PDU session resources are setup or requested during the registration. For example, the authentication signaling could be based on EAP-AKA, 5G-AKA, EAP-TLS, or other known technique. For example, in this operation, the IAB node can indicate to the CN that it is, in fact, an IAB node. Alternately, this information can be stored in the subscription data associated with the IMSI or SUPI provided by the IAB node to the CN during this operation. As such, the CN can determine the status of the IAB node based on referencing this stored information.

Subsequently, the CN can set up resources (e.g., context) for the IAB node in the RAN (operation 7). This operation can include the CN sending down security context (e.g. keys), capability related information, etc. to the RAN. This operation could also include the CN sending an indication, to the RAN, that this context is related to an IAB node rather than, e.g., a UE. In a conventional UE setup procedure, this can include information regarding default bearer configuration. However, this information can be excluded in the setup of the IAB node context performed in operation 7.

Subsequently, the RAN (gNB or eNB) can set up security with the IAB node. This can include sending a security mode command (operation 8), the IAB node deriving security keys, and responding with a security mode complete message (operation 9). Once security has been established, the RAN can set up one or more Backhaul Bearers towards the IAB node (operations 10-11). Conventional UE bearer setup/modification originates from the CN. In exemplary embodiments of the present disclosure, however, the setup of the backhaul bearers for the IAB node is initiated from the RAN. For example, these backhaul bearers could be associated with a configuration of the adaptation layer between the IAB node and other nodes.

Once the IAB node has been configured with one or more backhaul bearers, various methods for IP address assignment can be utilized. In some embodiments, an IAB donor DU function can request multiple IP addresses (e.g. using DHCP, or OAM signalling) from an external entity or node. After receiving such IP addresses, the IAB donor DU can assign one or more of them to the IAB node.

In some embodiments, for example, this assignment to the IAB node can be performed by the DU function sending a ICMPv6 Router Advertisement message over a backhaul bearer towards the IAB node. For example, the routing of this message could be handled by the adaptation layer (e.g., in case of multiple hops), meaning the DU can indicate the target IAB node in the adaptation layer header. When an IAB node receives this message, for example, it can determine its own IP address using existing IPv6 methods and can also indicate its presence to other nodes using IPv6 techniques such as Neighbour Discovery Protocol (NDP) or ICMPv6 Neighbor Solicitation and Neighbor Advertisement.

In other embodiments, this assignment to the IAB node can be performed by the DU function sending IP address(es) to IAB node directly, e.g., as part of an adaption layer protocol or by using other Internet protocols such as DHCP, ARP, etc.

In other embodiments, this assignment to the IAB node can be performed by the DU function sending the IP address(es) of the IAB node to the CU, and then the CU then sending the IP address(es) to the IAB node using a CP signalling protocol such as RRC. In such case, the IP address assignment would be protected over the radio links using the available RRC/PDCP integrity protection, as discussed above.

Other exemplary embodiments include methods and/or procedures in IAB donor CU for assigning the IP address(es) to the IAB node and/or notifying the IAB donor DU routing function. In some embodiments, these functions can be performed by the IAB donor CU sending an F1-AP message to the donor DU or second IAB node, the message containing the routing information for an IAB node. The routing information can include, e.g., adaptation layer addressing information, IP address of first IAB node, QoS requirements, etc. In other embodiments, these functions can be performed by the IAB donor CU sending an message via RRC or other signalling protocol (e.g., NAS) to the IAB node via the DU with information about IAB node's IP address.

Other exemplary embodiments include methods and/or procedures in an IAB node for obtaining IP address information and/or informing DU about assigned IP address. In some embodiments, the IAB node can be pre-configured with one or more (static) IP address(es). In other embodiments, the IAB node can send a request for IP address(es) over a radio bearer. The request could be a DHCP request, NDP or ICMP Router Solicitation, Neighbor Solicitation, Neighbor Advertisement, or be part of an adaption layer procedure. In other exemplary embodiments, the IAB node can send a message towards a DU or CU over a radio bearer to indicate (e.g., announce) its IP address(es) using similar protocols as above. In case the IAB node receives a response message indicating that address is used, the IAB node could generate a new address. Such a response message can be part of various other embodiments discussed above.

In other embodiments, the IAB node could request or generate multiple IP addresses. For instance, different IP addresses could be generated, each associated with a different backhaul bearer or with different QoS class. For example, a particular IP address could be used for end user traffic with a particular QoS requirement, or for a particular QoS flow indication. In other embodiments, the IAB node can send a request for an IP address(es) using MAC-layer CE or PDCP-layer control PDUs. Alternately, the IAB node can send an announcement of its IP address(es) using MAC-layer CE or PDCP-layer control PDUs.

Other exemplary embodiments include methods and/or procedures, performed by a DU and/or CU, for creating mapping rules and performing mapping of F1-related IP traffic between the IP address(es) associated with the IAB node and backhaul bearers setup from the DU towards the IAB node. In some embodiments, the mapping could be done towards the IAB node's address in the adaption layer configured for the backhaul bearers. For example, the mapping rules could be created based on IP address information provided to the DU or CU, from the IAB node, or from the CU.

Various exemplary embodiments described above can also be utilized together (e.g., combined) in various ways to achieve exemplary benefits discussed above. For example, the IAB node embodiments for IP assignments could be combined with corresponding IAB donor DU or CU functions. As another example, the embodiments related to IP assignment can also be performed in cases when the CN assigns IP address and performs setup of a user plane resource. In such case, this could be done in various ways. In some embodiments, the CN could assign one or more IP addresses, to IAB node, that are not used by the IAB node for F1 traffic, with the IAB node getting additional IP address(es) for F1 traffic assigned in the RAN-based methods described above. In other embodiments, the CN could assign one or more IP addresses to the IAB node, which then announces these IP address(es) to the DU or CU using methods described above.

Figure 13:
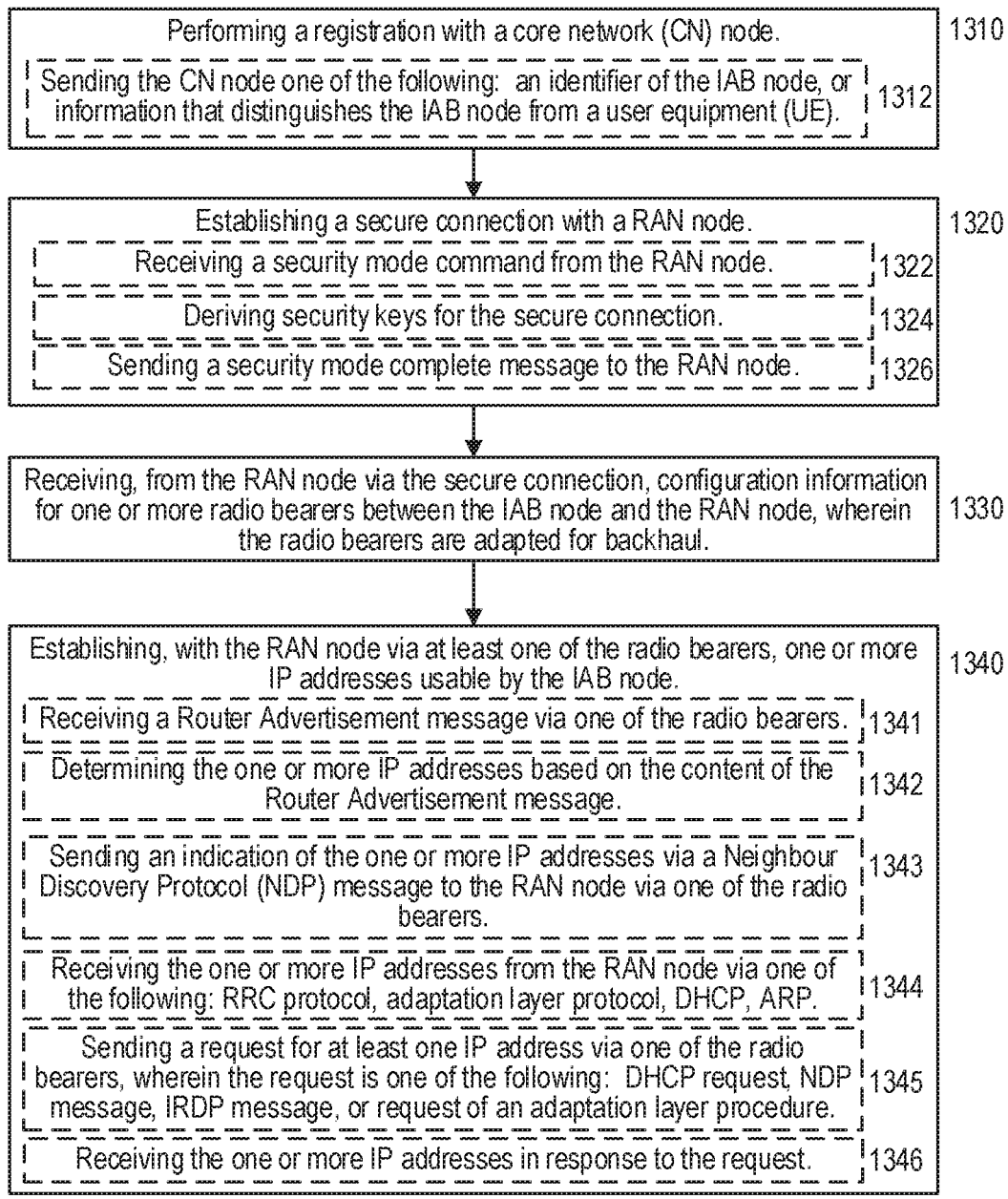
FIG. 13 shows a flow diagram of an exemplary method and/or procedure for an integrated access backhaul (IAB) node (e.g., IAB-DU, IAB-MT, or a combination thereof), according to various exemplary embodiments of the present disclosure.

FIG. 13 illustrates an exemplary method and/or procedure performed by an integrated access backhaul (IAB) node of a radio access network (RAN) that is associated with a core network (CN), according to various exemplary embodiments of the present disclosure. The exemplary methods and/or procedure can also be performed by one or more components of an IAB node, such as an IAB-DU and/or IAB-MT. Although the exemplary method and/or procedure is illustrated in FIG. 13 by blocks in a particular order, this order is exemplary and the operations corresponding to the blocks can be performed in different orders than shown, and can be combined and/or divided into blocks having different functionality than shown. The exemplary method and/or procedure shown in FIG. 13 can also be complimentary to other exemplary methods and/or procedures disclosed herein (e.g., such as in FIGS. 12, 14, and/or 15), such that they are capable of being used cooperatively to provide benefits, advantages, and/or solutions to problems described herein. Optional operations are indicated by dashed lines.

The exemplary method and/or procedure can include the operations of block 1310, where the IAB node can perform a registration with a CN node. In some embodiments, a packet data connection and protocol data unit (PDU) resources are neither requested nor setup during the registration. In some embodiments, the operations of block 1310 can include the operations of sub-block 1312, where the IAB node can send the CN node one of the following: an identifier of the IAB node, or information that distinguishes the IAB node from a user equipment (UE).

The exemplary method and/or procedure can also include the operations of block 1320, where the IAB node can establish a secure connection with a RAN node. In some embodiments, the operations of block 1320 can include the operations of sub-blocks 1322-1326. In such embodiments, the IAB node can receive a security mode command from the RAN node (1322), derive security keys for the secure connection (1324), and send a security mode complete message to the RAN node (1326).

The exemplary method and/or procedure can also include the operations of block 1330, where the IAB node can receive, from the RAN node via the secure connection, configuration information for one or more radio bearers between the IAB node and the RAN node. The radio bearers can be adapted for backhaul of at least one of the following: control plane information, or user plane information. In some embodiments, the one or more radio bearers are associated with an adaptation layer between the IAB node and one or more other nodes in the RAN. In some embodiments, the IAB node can establish the secure connection (block 1320) and receive the configuration information with respect to a centralized unit (CU) of the RAN node.

The exemplary method and/or procedure can also include the operations of block 1340, where the IAB node can establish, with the RAN node via at least one of the radio bearers, one or more Internet Protocol (IP) addresses usable by the IAB node. In some embodiments, one or more IP addresses can include a plurality of IP addresses, where each IP address is associated with a different backhaul bearer or with a different quality of service (QoS) class. In some embodiments, the IAB node can establish the one or more IP addresses with respect to a distributed unit (DU) of the RAN node.

In some embodiments, the operations of block 1340 can include the operations of block 1341, where the IAB node can receive a Router Advertisement message via one of the radio bearers. In such embodiments, the operations of block 1340 can also include the operations of block 1342, where the IAB node can determine the one or more IP addresses based on the content of the Router Advertisement message. In some embodiments, the operations of block 1340 can also include the operations of block 1342, where the IAB node can send an indication of the one or more IP addresses via a Neighbour Discovery Protocol (NDP) message to the RAN node via one of the radio bearers.

In other embodiments, the operations of block 1340 can include the operations of block 1344, where the IAB node can receive the one or more IP addresses from the RAN node via one of the following: Radio Resource Control (RRC)

protocol; an adaptation layer protocol; Dynamic Host Configuration Protocol (DHCP); or Address Resolution Protocol (ARP).

In other embodiments, the operations of block 1340 can include the operations of block 1345, where the IAB node can send a request for at least one IP address via one of the radio bearers. In such embodiments, the request can be one of the following: a DHCP request; an NDP message; an Internet Router Discovery Protocol (IRDP) message; and a request comprising an adaptation layer procedure. In such embodiments, the operations of block 1340 can include the operations of block 1346, where the IAB node can receive the one or more IP addresses in response to the request.

Figure 14:
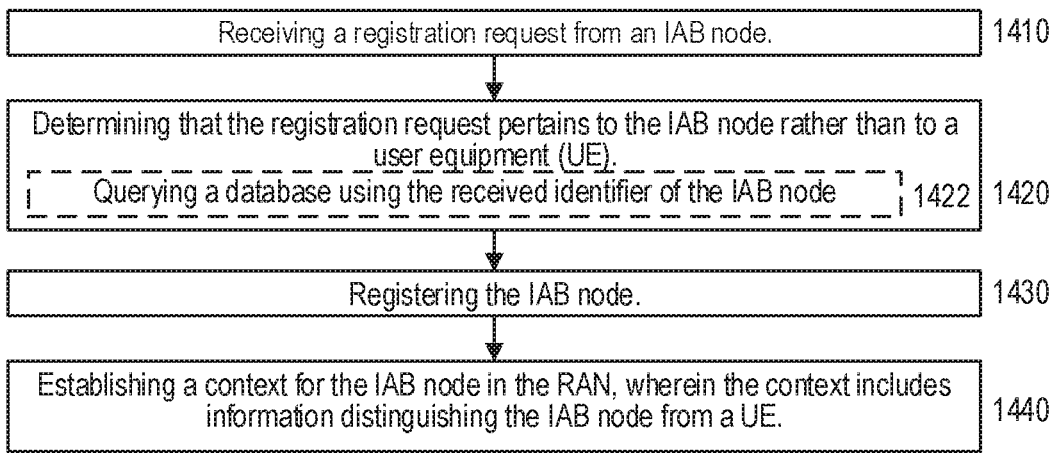
FIG. 14 shows a flow diagram of an exemplary method and/or procedure for a core network (CN) node (e.g., AMF, UPF, MME, SGW, etc., or component thereof), according to various exemplary embodiments of the present disclosure.

FIG. 14 illustrates an exemplary method and/or procedure for configuring an integrated access backhaul (IAB) node in a radio access network (RAN), according to various exemplary embodiments of the present disclosure. The exemplary method and/or procedure can be performed by performed by a node (e.g., AMF, UPF, MME, SGW, or combination thereof) in a core network (CN) that is associated with the RAN. Although the exemplary method and/or procedure is illustrated in FIG. 14 by blocks in a particular order, this order is exemplary and the operations corresponding to the blocks can be performed in different orders than shown, and can be combined and/or divided into blocks having different functionality than shown. The exemplary method and/or procedure shown in FIG. 14 can also be complimentary to other exemplary methods and/or procedures disclosed herein (e.g., FIGS. 12, 13, and/or 15), such that they are capable of being used cooperatively to provide benefits, advantages, and/or solutions to problems described herein. Optional operations are indicated by dashed lines.

The exemplary method and/or procedure can include the operations of block 1410, where the CN node can receive a registration request from an integrated access backhaul (IAB) node in the RAN. In some embodiments, the registration request does not include a request for either a packet data connection or protocol data unit (PDU) resources. In some embodiments, the registration request includes one of the following: an identifier of the IAB node; and information that distinguishes the IAB node from a UE.

The exemplary method and/or procedure can also include the operations of block 1420, where the CN node can determine that the registration request pertains to the IAB node rather than a user equipment (UE). In some embodiments, this determination can be based on information included in the registration request, e.g., the information that distinguishes the IAB node from a UE. In some embodiments, the operations of block 1420 can include the operations of sub-block 1422, where the CN node can query a database (e.g., a subscription database) using the received identifier of the IAB node.

The exemplary method and/or procedure can also include the operations of block 1430, where the CN node can register the IAB node. In some embodiments, the registration does not include setup of a packet data connection or PDU resources. The exemplary method and/or procedure can also include the operations of block 1440, where the CN node can establish a context for the JAB node in the RAN, wherein the context includes information distinguishing the IAB node from a UE. In some embodiments, the context for the IAB node in the RAN excludes a default radio bearer configuration.

Figure 15:
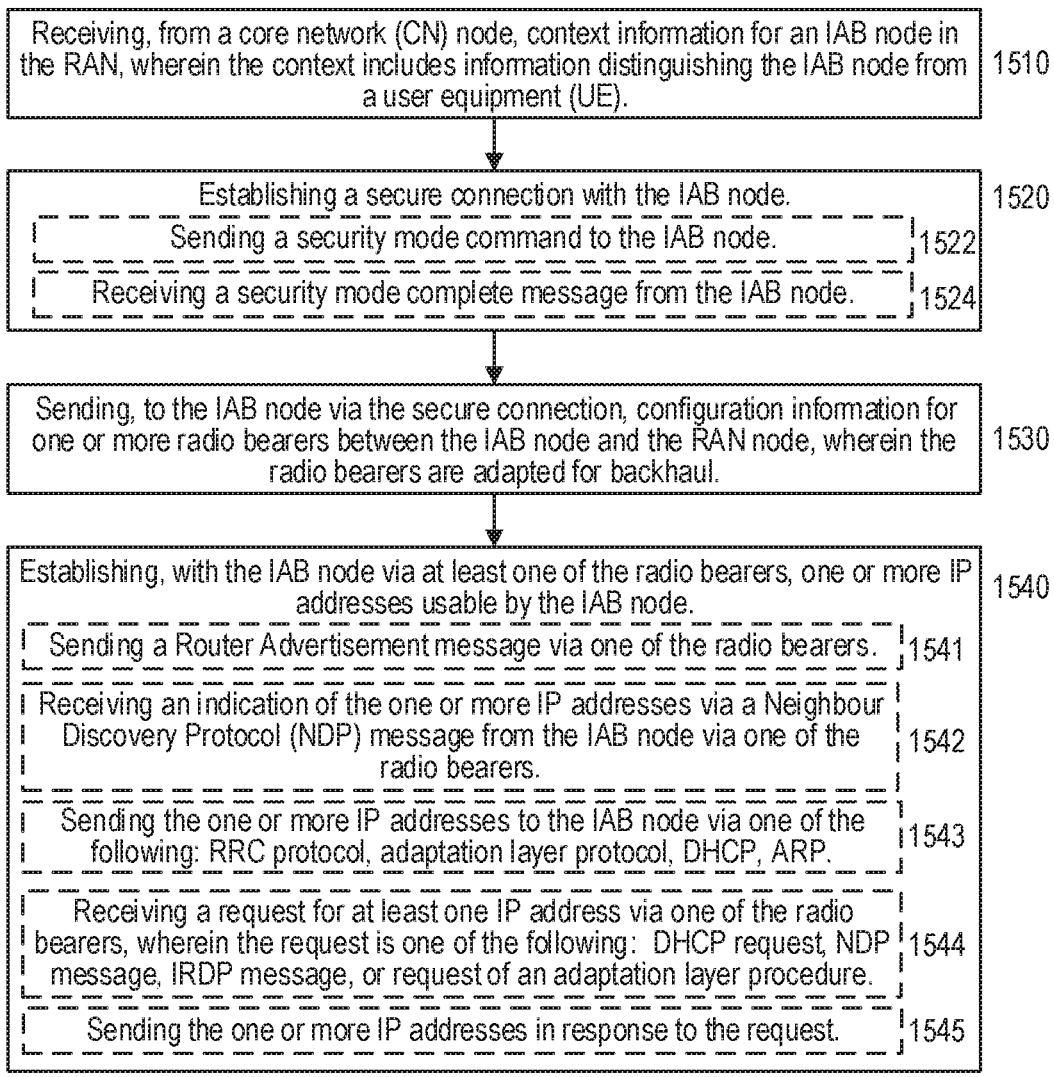
FIG. 15 shows a flow diagram of an exemplary method and/or procedure for a radio access network (RAN) node (e.g., base station, gNB, eNB, en-gNB, ng-eNB, etc., or component thereof), according to various exemplary embodiments of the present disclosure.

FIG. 15 illustrates an exemplary method and/or procedure for configuring an integrated access backhaul (IAB) node in a radio access network (RAN), according to various exemplary embodiments of the present disclosure. The exemplary method and/or procedure can be performed by a node (e.g., base station, eNB, gNB, ng-eNB, en-gNB, etc. or component therof) in the RAN that is associated with a core network (CN), in accordance with various exemplary embodiments of the present disclosure. Although the exemplary method and/or procedure is illustrated in FIG. 15 by blocks in a particular order, this order is exemplary and the operations corresponding to the blocks can be performed in different orders than shown, and can be combined and/or divided into blocks having different functionality than shown. The exemplary method and/or procedure shown in FIG. 15 can be complimentary to other exemplary methods and/or procedures disclosed herein (e.g., FIGS. 12, 13, and/or 14), such that they are capable of being used cooperatively to provide the benefits, advantages, and/or solutions to problems described herein. Optional operations are indicated by dashed lines.

The exemplary method and/or procedure can include the operations of block 1510, where the RAN node can receive, from a CN node, context information for the IAB node in the RAN, wherein the context includes information distinguishing the IAB node from a user equipment (UE). In some embodiments, the context information can exclude a default radio bearer configuration.

The exemplary method and/or procedure can also include the operations of block 1520, where the RAN node can establishing a secure connection with the IAB node. In some embodiments, the operations of block 1520 can include the operations of sub-blocks 1522, where the RAN node can send a security mode command to the IAB node, and 1524, where the RAN node can receive a security mode complete message from the IAB node.

The exemplary method and/or procedure can also include the operations of block 1530, where the RAN node can send, to the IAB node via the secure connection, configuration information for one or more radio bearers adapted for backhaul of at least one of the following: control plane information, or user plane information. In some embodiments, the one or more radio bearers can be associated with an adaptation layer between the IAB node and one or more other nodes in the RAN.

The exemplary method and/or procedure can also include the operations of block 1540, where the RAN node can establish, via at least one of the radio bearers usable for backhaul, one or more Internet Protocol (IP) addresses usable by the IAB node. In some embodiments, the one or more IP addresses can include a plurality of IP addresses, where each IP address is associated with a different backhaul bearer or with a different quality of service (QoS) class.

In some embodiments, the operations of block 1510, 1520, and 1530 can be performed by a centralized unit (CU) of the RAN node, and the operations of block 1540 can be performed by a distributed unit (DU) of the RAN node.

In some embodiments, the operations of block 1540 can include the operations of block 1541, where the RAN node can send a Router Advertisement message via one of the radio bearers. The content of the Router Advertisement message can include information from which the one or more IP addresses can be determined. In other embodiments, the operations of block 1540 can include the operations of block 1542, where the RAN node can receive an indication of the one or more IP addresses via a Neighbour Discovery Protocol (NDP) message from the IAB node via one of the radio bearers.

In other embodiments, the operations of block 1540 can include the operations of block 1543, where the RAN node can send the one or more IP addresses to the IAB node via one of the following: Radio Resource Control (RRC) protocol; an adaptation layer protocol; Dynamic Host Configuration Protocol (DHCP); or Address Resolution Protocol (ARP).

In other embodiments, the operations of block 1540 can include the operations of block 1544, where the RAN node can receive a request for at least one IP address via one of the radio bearers. In such embodiments, the request can be one of the following: a DHCP request; an NDP message; an Internet Router Discovery Protocol (IRDP) message; or a request comprising an adaptation layer procedure. In such embodiments, the operations of block 1540 can include the operations of block 1545, where the RAN node can send the one or more IP addresses in response to the request.

Figure 16:
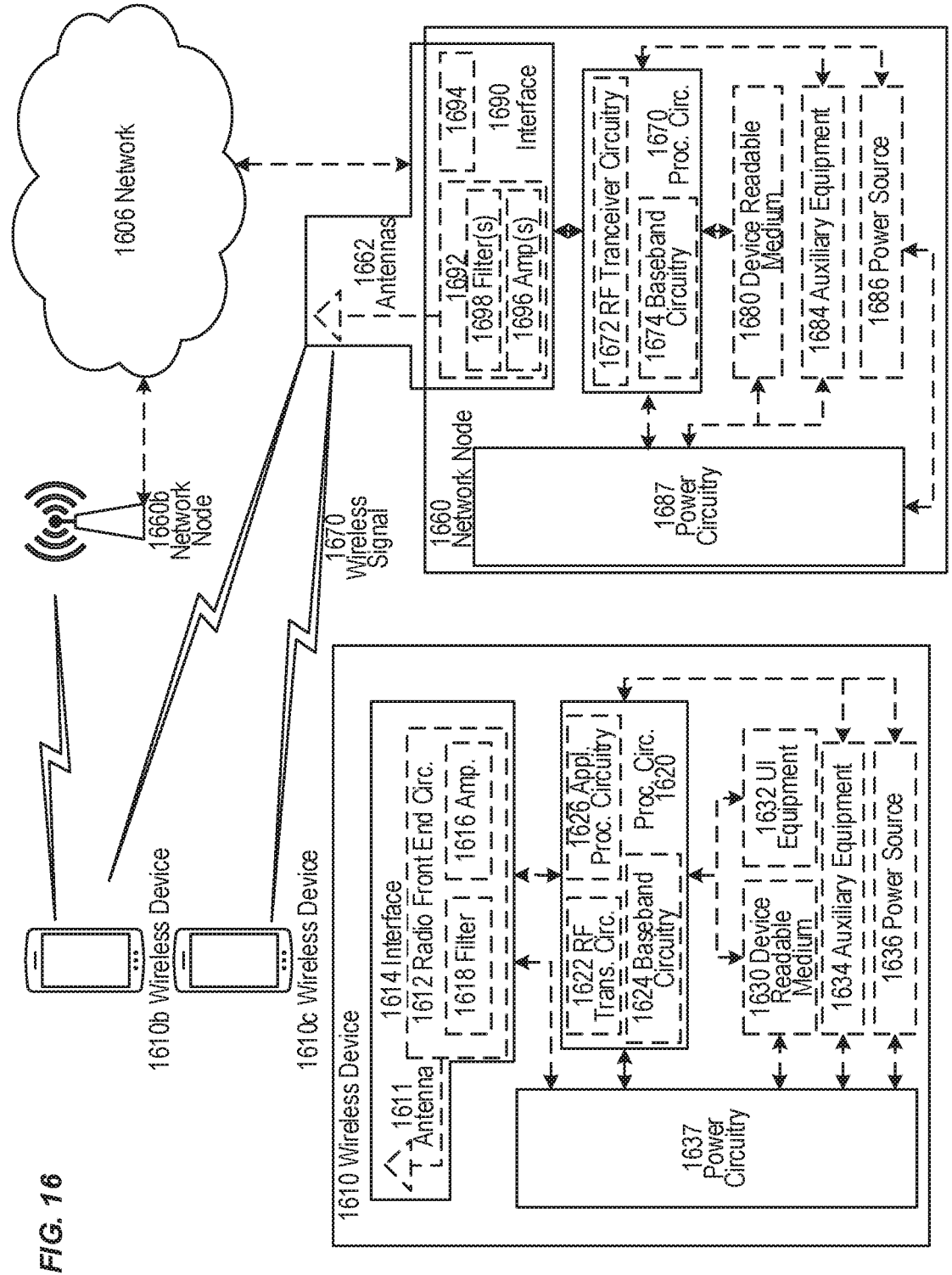
FIG. 16 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660b, and WDs 1610, 1610b, and 1610c. In practice, a wireless network can further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1660 are depicted as single boxes located within a larger box, or nested within multiple boxes, in practice, a network node can comprise multiple different physical components that make up a single illustrated component (e.g., device readable medium 1680 can comprise multiple separate hard drives as well as multiple RAM modules).

Similarly, network node 1660 can be composed of multiple physically separate components (e.g., a NodeB component and a RNC component, or a BTS component and a BSC component, etc.), which can each have their own respective components. In certain scenarios in which network node 1660 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1660 can be configured to support multiple radio access technologies (RATs). In such embodiments, some components can be duplicated (e.g., separate device readable medium 1680 for the different RATs) and some components can be reused (e.g., the same antenna 1662 can be shared by the RATs). Network node 1660 can also include multiple sets of the various illustrated components for different wireless technologies integrated into network node 1660, such as, for example, GSM, WCDMA, LTE, NR, WiFi, or Bluetooth wireless technologies. These wireless technologies can be integrated into the same or different chip or set of chips and other components within network node 1660.

Processing circuitry 1670 can be configured to perform any determining, calculating, or similar operations (e.g., certain obtaining operations) described herein as being provided by a network node. These operations performed by processing circuitry 1670 can include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 can execute instructions stored in device readable medium 1680 or in memory within processing circuitry 1670. Such functionality can include providing any of the various wireless features, functions, or benefits discussed herein. In some embodiments, processing circuitry 1670 can include a system on a chip (SOC).

In some embodiments, processing circuitry 1670 can include one or more of radio frequency (RF) transceiver circuitry 1672 and baseband processing circuitry 1674. In some embodiments, radio frequency (RF) transceiver circuitry 1672 and baseband processing circuitry 1674 can be on separate chips (or sets of chips), boards, or units, such as radio units and digital units. In alternative embodiments, part or all of RF transceiver circuitry 1672 and baseband processing circuitry 1674 can be on the same chip or set of chips, boards, or units In certain embodiments, some or all of the functionality described herein as being provided by a network node, base station, eNB or other such network device can be performed by processing circuitry 1670 executing instructions stored on device readable medium 1680 or memory within processing circuitry 1670. In alternative embodiments, some or all of the functionality can be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1670. Device readable medium 1680 can store any suitable instructions, data or information, including a computer program, software, an application including one or more of logic, rules, code, tables, etc. and/or other instructions capable of being executed by processing circuitry 1670 and, utilized by network node 1660. Device readable medium 1680 can be used to store any calculations made by processing circuitry 1670 and/or any data received via interface 1690. In some embodiments, processing circuitry 1670 and device readable medium 1680 can be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that can be coupled to, or in certain embodiments a part of, antenna 1662. Radio front end circuitry 1692 comprises filters 1698 and amplifiers 1696. Radio front end circuitry 1692 can be connected to antenna 1662 and processing circuitry 1670. Radio front end circuitry can be configured to condition signals communicated between antenna 1662 and processing circuitry 1670. Radio front end circuitry 1692 can receive digital data that is to be sent out to other network nodes or WDs via a wireless connection. Radio front end circuitry 1692 can convert the digital data into a radio signal having the appropriate channel and bandwidth parameters using a combination of filters 1698 and/or amplifiers 1696. The radio signal can then be transmitted via antenna 1662. Similarly, when receiving data, antenna 1662 can collect radio signals which are then converted into digital data by radio front end circuitry 1692. The digital data can be passed to processing circuitry 1670. In other embodiments, the interface can comprise different components and/or different combinations of components.

In certain alternative embodiments, network node 1660 may not include separate radio front end circuitry 1692, instead, processing circuitry 1670 can comprise radio front end circuitry and can be connected to antenna 1662 without separate radio front end circuitry 1692. Similarly, in some embodiments, all or some of RF transceiver circuitry 1672 can be considered a part of interface 1690. In still other embodiments, interface 1690 can include one or more ports or terminals 1694, radio front end circuitry 1692, and RF transceiver circuitry 1672, as part of a radio unit (not shown), and interface 1690 can communicate with baseband processing circuitry 1674, which is part of a digital unit (not shown).

Antenna 1662 can include one or more antennas, or antenna arrays, configured to send and/or receive wireless signals. Antenna 1662 can be coupled to radio front end circuitry 1690 and can be any type of antenna capable of transmitting and receiving data and/or signals wirelessly. In some embodiments, antenna 1662 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1662 can be separate from network node 1660 and can be connectable to network node 1660 through an interface or port.

Antenna 1662, interface 1690, and/or processing circuitry 1670 can be configured to perform any receiving operations and/or certain obtaining operations described herein as being performed by a network node. Any information, data and/or signals can be received from a wireless device, another network node and/or any other network equipment. Similarly, antenna 1662, interface 1690, and/or processing circuitry 1670 can be configured to perform any transmitting operations described herein as being performed by a network node. Any information, data and/or signals can be transmitted to a wireless device, another network node and/or any other network equipment.

Power circuitry 1687 can comprise, or be coupled to, power management circuitry and can be configured to supply the components of network node 1660 with power for performing the functionality described herein. Power circuitry 1687 can receive power from power source 1686. Power source 1686 and/or power circuitry 1687 can be configured to provide power to the various components of network node 1660 in a form suitable for the respective components (e.g., at a voltage and current level needed for each respective component). Power source 1686 can either be included in, or external to, power circuitry 1687 and/or network node 1660. For example, network node 1660 can be connectable to an external power source (e.g., an electricity outlet) via an input circuitry or interface such as an electrical cable, whereby the external power source supplies power to power circuitry 1687. As a further example, power source 1686 can comprise a source of power in the form of a battery or battery pack which is connected to, or integrated in, power circuitry 1687. The battery can provide backup power should the external power source fail. Other types of power sources, such as photovoltaic devices, can also be used.

Alternative embodiments of network node 1660 can include additional components beyond those shown in FIG. 16 that can be responsible for providing certain aspects of the network node's functionality, including any of the functionality described herein and/or any functionality necessary to support the subject matter described herein. For example, network node 1660 can include user interface equipment to allow and/or facilitate input of information into network node 1660 and to allow and/or facilitate output of information from network node 1660. This can allow and/or facilitate a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 can include multiple sets of one or more of the illustrated components for different wireless technologies supported by WD 1610, such as, for example, GSM, WCDMA, LTE, NR, WiFi, WiMAX, or Bluetooth wireless technologies, just to mention a few. These wireless technologies can be integrated into the same or different chips or set of chips as other components within WD 1610.

Antenna 1611 can include one or more antennas or antenna arrays, configured to send and/or receive wireless signals, and is connected to interface 1614. In certain alternative embodiments, antenna 1611 can be separate from WD 1610 and be connectable to WD 1610 through an interface or port. Antenna 1611, interface 1614, and/or processing circuitry 1620 can be configured to perform any receiving or transmitting operations described herein as being performed by a WD. Any information, data and/or signals can be received from a network node and/or another WD. In some embodiments, radio front end circuitry and/or antenna 1611 can be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and can be configured to condition signals communicated between antenna 1611 and processing circuitry 1620. Radio front end circuitry 1612 can be coupled to or a part of antenna 1611. In some embodiments, WD 1610 may not include separate radio front end circuitry 1612; rather, processing circuitry 1620 can comprise radio front end circuitry and can be connected to antenna 1611. Similarly, in some embodiments, some or all of RF transceiver circuitry 1622 can be considered a part of interface 1614. Radio front end circuitry 1612 can receive digital data that is to be sent out to other network nodes or WDs via a wireless connection. Radio front end circuitry 1612 can convert the digital data into a radio signal having the appropriate channel and bandwidth parameters using a combination of filters 1618 and/or amplifiers 1616. The radio signal can then be transmitted via antenna 1611. Similarly, when receiving data, antenna 1611 can collect radio signals which are then converted into digital data by radio front end circuitry 1612. The digital data can be passed to processing circuitry 1620. In other embodiments, the interface can comprise different components and/or different combinations of components.

Processing circuitry 1620 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality can include providing any of the various wireless features or benefits discussed herein. For example, processing circuitry 1620 can execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry can comprise different components and/or different combinations of components. In certain embodiments processing circuitry 1620 of WD 1610 can comprise a SOC. In some embodiments, RF transceiver circuitry 1622, baseband processing circuitry 1624, and application processing circuitry 1626 can be on separate chips or sets of chips. In alternative embodiments, part or all of baseband processing circuitry 1624 and application processing circuitry 1626 can be combined into one chip or set of chips, and RF transceiver circuitry 1622 can be on a separate chip or set of chips. In still alternative embodiments, part or all of RF transceiver circuitry 1622 and baseband processing circuitry 1624 can be on the same chip or set of chips, and application processing circuitry 1626 can be on a separate chip or set of chips. In yet other alternative embodiments, part or all of RF transceiver circuitry 1622, baseband processing circuitry 1624, and application processing circuitry 1626 can be combined in the same chip or set of chips. In some embodiments, RF transceiver circuitry 1622 can be a part of interface 1614. RF transceiver circuitry 1622 can condition RF signals for processing circuitry 1620.

In certain embodiments, some or all of the functionality described herein as being performed by a WD can be provided by processing circuitry 1620 executing instructions stored on device readable medium 1630, which in certain embodiments can be a computer-readable storage medium. In alternative embodiments, some or all of the functionality can be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 can be configured to perform any determining, calculating, or similar operations (e.g., certain obtaining operations) described herein as being performed by a WD. These operations, as performed by processing circuitry 1620, can include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 can be operable to store a computer program, software, an application including one or more of logic, rules, code, tables, etc. and/or other instructions capable of being executed by processing circuitry 1620. Device readable medium 1630 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1620. In some embodiments, processing circuitry 1620 and device readable medium 1630 can be considered to be integrated.

User interface equipment 1632 can include components that allow and/or facilitate a human user to interact with WD 1610. Such interaction can be of many forms, such as visual, audial, tactile, etc. User interface equipment 1632 can be operable to produce output to the user and to allow and/or facilitate the user to provide input to WD 1610. The type of interaction can vary depending on the type of user interface equipment 1632 installed in WD 1610. For example, if WD 1610 is a smart phone, the interaction can be via a touch screen; if WD 1610 is a smart meter, the interaction can be through a screen that provides usage (e.g., the number of gallons used) or a speaker that provides an audible alert (e.g., if smoke is detected). User interface equipment 1632 can include input interfaces, devices and circuits, and output interfaces, devices and circuits. User interface equipment 1632 can be configured to allow and/or facilitate input of information into WD 1610, and is connected to processing circuitry 1620 to allow and/or facilitate processing circuitry 1620 to process the input information. User interface equipment 1632 can include, for example, a microphone, a proximity or other sensor, keys/buttons, a touch display, one or more cameras, a USB port, or other input circuitry. User interface equipment 1632 is also configured to allow and/or facilitate output of information from WD 1610, and to allow and/or facilitate processing circuitry 1620 to output information from WD 1610. User interface equipment 1632 can include, for example, a speaker, a display, vibrating circuitry, a USB port, a headphone interface, or other output circuitry. Using one or more input and output interfaces, devices, and circuits, of user interface equipment 1632, WD 1610 can communicate with end users and/or the wireless network, and allow and/or facilitate them to benefit from the functionality described herein.

Auxiliary equipment 1634 is operable to provide more specific functionality which may not be generally performed by WDs. This can comprise specialized sensors for doing measurements for various purposes, interfaces for additional types of communication such as wired communications etc. The inclusion and type of components of auxiliary equipment 1634 can vary depending on the embodiment and/or scenario.

Power source 1636 can, in some embodiments, be in the form of a battery or battery pack. Other types of power sources, such as an external power source (e.g., an electricity outlet), photovoltaic devices or power cells, can also be used. WD 1610 can further comprise power circuitry 1637 for delivering power from power source 1636 to the various parts of WD 1610 which need power from power source 1636 to carry out any functionality described or indicated herein. Power circuitry 1637 can in certain embodiments comprise power management circuitry. Power circuitry 1637 can additionally or alternatively be operable to receive power from an external power source; in which case WD 1610 can be connectable to the external power source (such as an electricity outlet) via input circuitry or an interface such as an electrical power cable. Power circuitry 1637 can also in certain embodiments be operable to deliver power from an external power source to power source 1636. This can be, for example, for the charging of power source 1636. Power circuitry 1637 can perform any converting or other modification to the power from power source 1636 to make it suitable for supply to the respective components of WD 1610.

Figure 17:
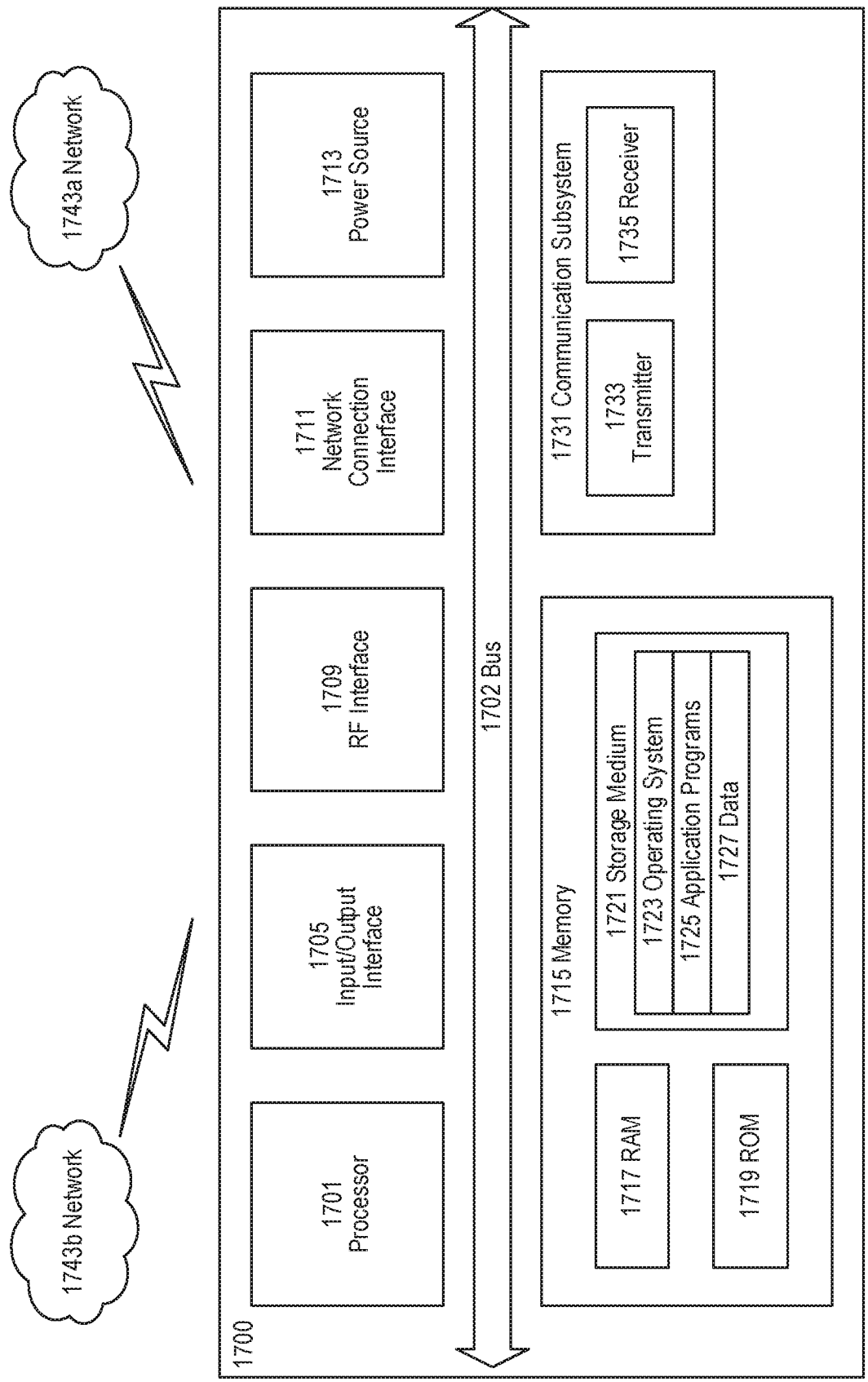
FIG. 17 illustrates an exemplary embodiment of a UE, in accordance with various aspects described herein.

FIG. 17 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 17200 can be any UE identified by the $3^{rd}$ Generation Partnership Project (3GPP), including a NB-IoT UE, a machine type communication (MTC) UE, and/or an enhanced MTC (eMTC) UE. UE 1700, as illustrated in FIG. 17, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 can include other similar types of information. Certain UEs can utilize all of the components shown in FIG. 17, or only a subset of the components. The level of integration between the components can vary from one UE to another UE. Further, certain UEs can contain multiple instances of a component, such as multiple processors, memories, transceivers, transmitters, receivers, etc.

In FIG. 17, processing circuitry 1701 can be configured to process computer instructions and data. Processing circuitry 1701 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 can include two central processing units (CPUs). Data can be information in a form suitable for use by a computer.

In the depicted embodiment, input/output interface 1705 can be configured to provide a communication interface to an input device, output device, or input and output device. UE 1700 can be configured to use an output device via input/output interface 1705. An output device can use the same type of interface port as an input device. For example, a USB port can be used to provide input to and output from UE 1700. The output device can be a speaker, a sound card, a video card, a display, a monitor, a printer, an actuator, an emitter, a smartcard, another output device, or any combination thereof. UE 1700 can be configured to use an input device via input/output interface 1705 to allow and/or facilitate a user to capture information into UE 1700. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 17, RF interface 1709 can be configured to provide a communication interface to RF components such as a transmitter, a receiver, and an antenna. Network connection interface 1711 can be configured to provide a communication interface to network 1743*a*. Network 1743*a* can encompass wired and/or wireless networks such as a local-area network (LAN), a wide-area network (WAN), a computer network, a wireless network, a telecommunications network, another like network or any combination thereof. For example, network 1743*a* can comprise a Wi-Fi network. Network connection interface 1711 can be configured to include a receiver and a transmitter interface used to communicate with one or more other devices over a communication network according to one or more communication protocols, such as Ethernet, TCP/IP, SONET, ATM, or the like. Network connection interface 1711 can implement receiver and transmitter functionality appropriate to the communication network links (e.g., optical, electrical, and the like). The transmitter and receiver functions can share circuit components, software or firmware, or alternatively can be implemented separately.

RAM 1717 can be configured to interface via bus 1702 to processing circuitry 1701 to provide storage or caching of data or computer instructions during the execution of software programs such as the operating system, application programs, and device drivers. ROM 1719 can be configured to provide computer instructions or data to processing circuitry 1701. For example, ROM 1719 can be configured to store invariant low-level system code or data for basic system functions such as basic input and output (I/O), startup, or reception of keystrokes from a keyboard that are stored in a non-volatile memory. Storage medium 1721 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 can be configured to include operating system 1723, application program 1725 such as a web browser application, a widget or gadget engine or another application, and data file 1727. Storage medium 1721 can store, for use by UE 1700, any of a variety of various operating systems or combinations of operating systems.

Storage medium 1721 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 can allow and/or facilitate UE 1700 to access computer-executable instructions, application programs or the like, stored on transitory or non-transitory memory media, to off-load data, or to upload data. An article of manufacture, such as one utilizing a communication system can be tangibly embodied in storage medium 1721, which can comprise a device readable medium.

In FIG. 17, processing circuitry 1701 can be configured to communicate with network 1743*b* using communication subsystem 1731. Network 1743*a* and network 1743*b* can be the same network or networks or different network or networks. Communication subsystem 1731 can be configured to include one or more transceivers used to communicate with network 1743*b*. For example, communication subsystem 1731 can be configured to include one or more transceivers used to communicate with one or more remote transceivers of another device capable of wireless communication such as another WD, UE, or base station of a radio access network (RAN) according to one or more communication protocols, such as IEEE 802.17, CDMA, WCDMA, GSM, LTE, UTRAN, WiMax, or the like. Each transceiver can include transmitter 1733 and/or receiver 1735 to implement transmitter or receiver functionality, respectively, appropriate to the RAN links (e.g., frequency allocations and the like). Further, transmitter 1733 and receiver 1735 of each transceiver can share circuit components, software or firmware, or alternatively can be implemented separately.

In the illustrated embodiment, the communication functions of communication subsystem 1731 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 can include cellular communication, Wi-Fi communication, Bluetooth communication, and GPS communication. Network 1743*b* can encompass wired and/or wireless networks such as a local-area network (LAN), a wide-area network (WAN), a computer network, a wireless network, a telecommunications network, another like network or any combination thereof. For example, network 1743*b* can be a cellular network, a Wi-Fi network, and/or a near-field network. Power source 1713 can be configured to provide alternating current (AC) or direct current (DC) power to components of UE 1700.

The features, benefits and/or functions described herein can be implemented in one of the components of UE 1700 or partitioned across multiple components of UE 1700. Further, the features, benefits, and/or functions described herein can be implemented in any combination of hardware, software or firmware. In one example, communication subsystem 1731 can be configured to include any of the components described herein. Further, processing circuitry 1701 can be configured to communicate with any of such components over bus 1702. In another example, any of such components can be represented by program instructions stored in memory that when executed by processing circuitry 1701 perform the corresponding functions described herein. In another example, the functionality of any of such components can be partitioned between processing circuitry 1701 and communication subsystem 1731. In another example, the non-computationally intensive functions of any of such components can be implemented in software or firmware and the computationally intensive functions can be implemented in hardware.

Figure 18:
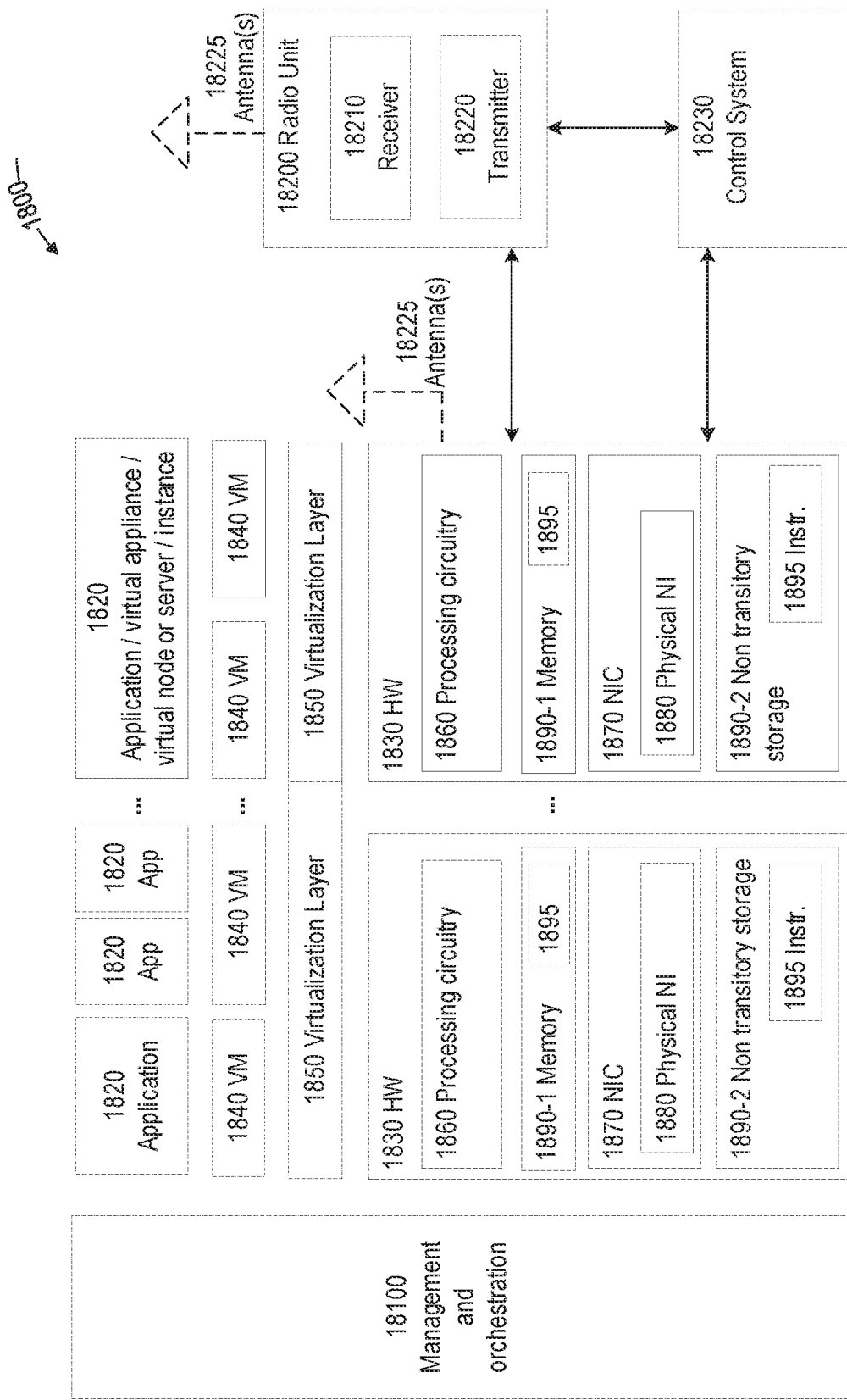
FIG. 18 is a block diagram illustrating an exemplary virtualization environment usable for implementation of various embodiments of network nodes described herein.

FIG. 18 is a schematic block diagram illustrating a virtualization environment 1800 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node can be entirely virtualized.

The functions can be implemented by one or more applications 1820 (which can alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which can be commercial off-the-shelf (COTS) processors, dedicated Application Specific Integrated Circuits (ASICs), or any other type of processing circuitry including digital or analog hardware components or special purpose processors. Each hardware device can comprise memory 1890-1 which can be non-persistent memory for temporarily storing instructions 1895 or software executed by processing circuitry 1860. Each hardware device can comprise one or more network interface controllers (NICs) 1870, also known as network interface cards, which include physical network interface 1880. Each hardware device can also include non-transitory, persistent, machine-readable storage media 1890-2 having stored therein software 1895 and/or instructions executable by processing circuitry 1860. Software 1895 can include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and can be run by a corresponding virtualization layer 1850 or hypervisor. Different embodiments of the instance of virtual appliance 1820 can be implemented on one or more of virtual machines 1840, and the implementations can be made in different ways.

During operation, processing circuitry 1860 executes software 1895 to instantiate the hypervisor or virtualization layer 1850, which can sometimes be referred to as a virtual machine monitor (VMM). Virtualization layer 1850 can present a virtual operating platform that appears like networking hardware to virtual machine 1840.

As shown in FIG. 18, hardware 1830 can be a standalone network node with generic or specific components. Hardware 1830 can comprise antenna 18225 and can implement some functions via virtualization. Alternatively, hardware 1830 can be part of a larger cluster of hardware (e.g., such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1840 can be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 can be coupled to one or more antennas 18225. Radio units 18200 can communicate directly with hardware nodes 1830 via one or more appropriate network interfaces and can be used in combination with the virtual components to provide a virtual node with radio capabilities, such as a radio access node or a base station.

In some embodiments, some signalling can be effected with the use of control system 18230 which can alternatively be used for communication between the hardware nodes 1830 and radio units 18200.

Figure 19:
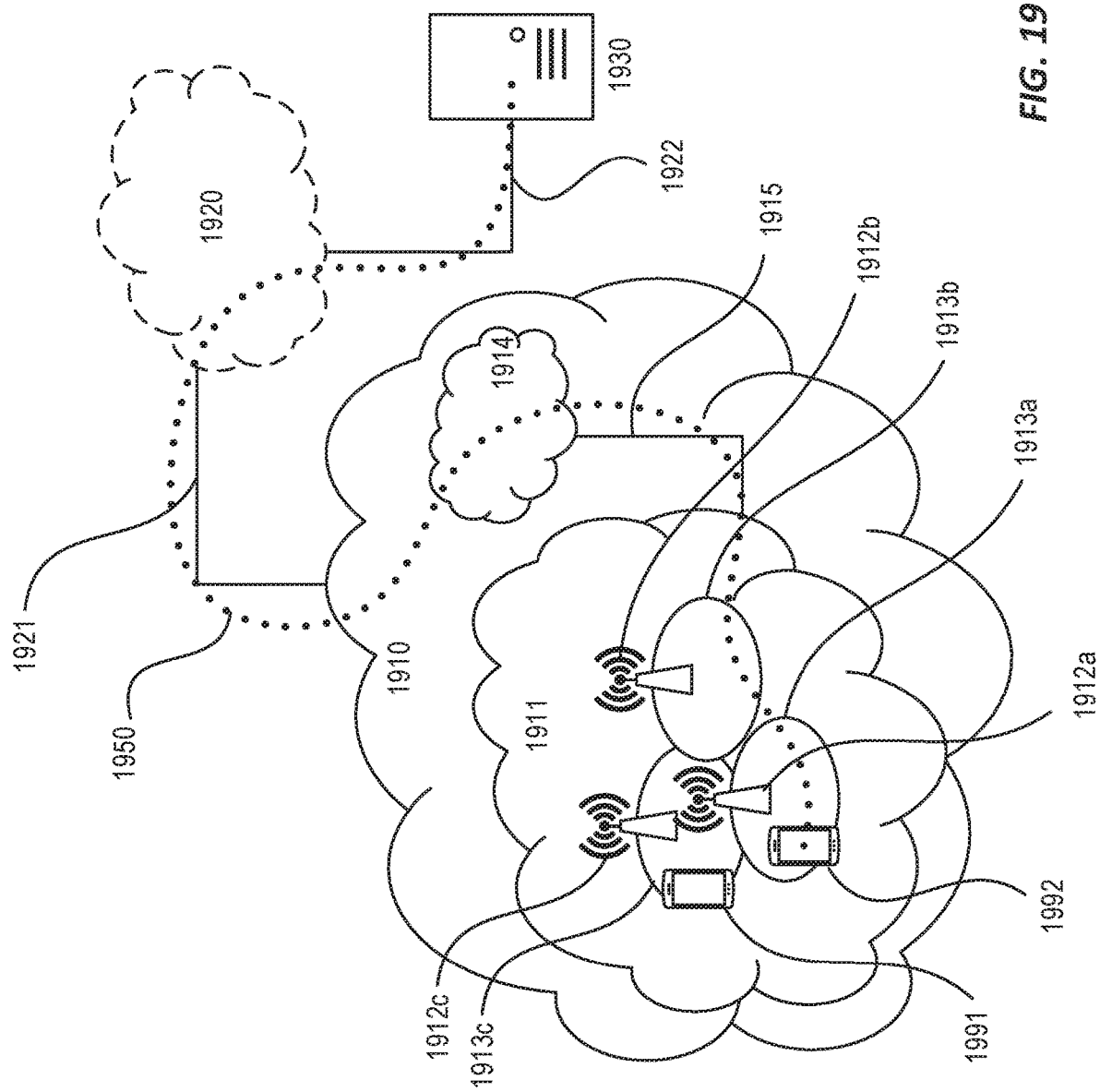
FIGS. 19-20 are block diagrams of various exemplary communication systems and/or networks, in accordance with various aspects described herein.

With reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A first UE 1991 located in coverage area 1913c can be configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which can be embodied in the hardware and/or software of a standalone server, a cloud-implemented server, a distributed server or as processing resources in a server farm. Host computer 1930 can be under the ownership or control of a service provider, or can be operated by the service provider or on behalf of the service provider. Connections 1921 and 1922 between telecommunication network 1910 and host computer 1930 can extend directly from core network 1914 to host computer 1930 or can go via an optional intermediate network 1920. Intermediate network 1920 can be one of, or a combination of more than one of, a public, private or hosted network; intermediate network 1920, if any, can be a backbone network or the Internet; in particular, intermediate network 1920 can comprise two or more sub-networks (not shown).

The communication system of FIG. 19 as a whole enables connectivity between the connected UEs 1991, 1992 and host computer 1930. The connectivity can be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 can be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Example implementations, in accordance with an embodiment, of the UE, base station and host computer discussed in the preceding paragraphs will now be described with reference to FIG. 20. In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which can have storage and/or processing capabilities. In particular, processing circuitry 2018 can comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 can be operable to provide a service to a remote user, such as UE 2030 connecting via OTT connection 2050 terminating at UE 2030 and host computer 2010. In providing the service to the remote user, host application 2012 can provide user data which is transmitted using OTT connection 2050.

Communication system 2000 can also include base station 2020 provided in a telecommunication system and comprising hardware 2025 enabling it to communicate with host computer 2010 and with UE 2030. Hardware 2025 can include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 can be configured to facilitate connection 2060 to host computer 2010. Connection 2060 can be direct or it can pass through a core network (not shown in FIG. 20) of the telecommunication system and/or through one or more intermediate networks outside the telecommunication system. In the embodiment shown, hardware 2025 of base station 2020 can also include processing circuitry 2028, which can comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 can also include UE 2030 already referred to. Its hardware 2035 can include radio interface 2037 configured to set up and maintain wireless connection 2070 with a base station serving a coverage area in which UE 2030 is currently located. Hardware 2035 of UE 2030 can also include processing circuitry 2038, which can comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 can be operable to provide a service to a human or non-human user via UE 2030, with the support of host computer 2010. In host computer 2010, an executing host application 2012 can communicate with the executing client application 2032 via OTT connection 2050 terminating at UE 2030 and host computer 2010. In providing the service to the user, client application 2032 can receive request data from host application 2012 and provide user data in response to the request data. OTT connection 2050 can transfer both the request data and the user data. Client application 2032 can interact with the user to generate the user data that it provides.

Figure 20:
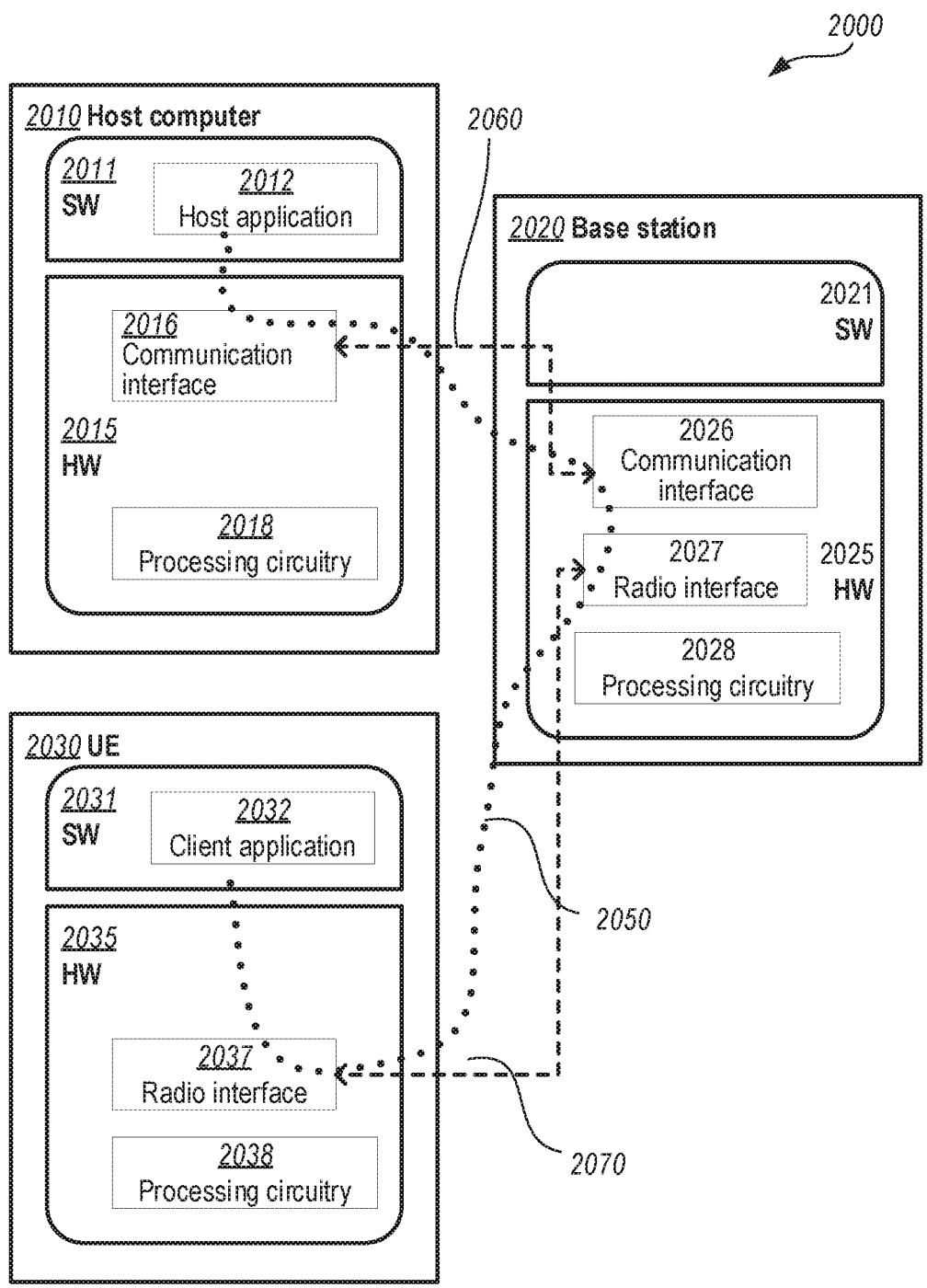

It is noted that host computer 2010, base station 2020 and UE 2030 illustrated in FIG. 20 can be similar or identical to host computer 1930, one of base stations 1912a, 1912b, 1912c and one of UEs 1991, 1992 of FIG. 19, respectively. This is to say, the inner workings of these entities can be as shown in FIG. 20 and independently, the surrounding network topology can be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure can determine the routing, which it can be configured to hide from UE 2030 or from the service provider operating host computer 2010, or both. While OTT connection 2050 is active, the network infrastructure can further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2050 between host computer 2010 and UE 2030, in response to variations in the measurement results. The measurement procedure and/or the network functionality for reconfiguring OTT connection 2050 can be implemented in software 2011 and hardware 2015 of host computer 2010 or in software 2031 and hardware 2035 of UE 2030, or both. In embodiments, sensors (not shown) can be deployed in or in association with communication devices through which OTT connection 2050 passes; the sensors can participate in the measurement procedure by supplying values of the monitored quantities exemplified above, or supplying values of other physical quantities from which software 2011, 2031 can compute or estimate the monitored quantities. The reconfiguring of OTT connection 2050 can include message format, retransmission settings, preferred routing etc.; the reconfiguring need not affect base station 2020, and it can be unknown or imperceptible to base station 2020. Such procedures and functionalities can be known and practiced in the art. In certain embodiments, measurements can involve proprietary UE signaling facilitating host computer 2010's measurements of throughput, propagation times, latency and the like. The measurements can be implemented in that software 2011 and 2031 causes messages to be transmitted, in particular empty or 'dummy' messages, using OTT connection 2050 while it monitors propagation times, errors etc.

FIG. 21 is a flowchart illustrating an exemplary method and/or procedure implemented in a communication system, in accordance with one embodiment. The communication system includes a host computer, a base station and a UE which, in some exemplary embodiments, can be those described with reference to FIGS. 19 and 20. For simplicity of the present disclosure, only drawing references to FIG. 21 will be included in this section. In step 2110, the host computer provides user data. In substep 2111 (which can be optional) of step 2110, the host computer provides the user data by executing a host application. In step 2120, the host computer initiates a transmission carrying the user data to the UE. In step 2130 (which can be optional), the base station transmits to the UE the user data which was carried in the transmission that the host computer initiated, in accordance with the teachings of the embodiments described throughout this disclosure. In step 2140 (which can also be optional), the UE executes a client application associated with the host application executed by the host computer.

FIG. 22 is a flowchart illustrating an exemplary method and/or procedure implemented in a communication system, in accordance with one embodiment. The communication system includes a host computer, a base station and a UE which can be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission can pass via the base station, in accordance with the teachings of the embodiments described throughout this disclosure. In step 2230 (which can be optional), the UE receives the user data carried in the transmission.

FIG. 23 is a flowchart illustrating an exemplary method and/or procedure implemented in a communication system, in accordance with one embodiment. The communication system includes a host computer, a base station and a UE which can be those described with reference to FIGS. 19 and 20. For simplicity of the present disclosure, only drawing references to FIG. 23 will be included in this section. In step 2310 (which can be optional), the UE receives input data provided by the host computer. Additionally or alternatively, in step 2320, the UE provides user data. In substep 2321 (which can be optional) of step 2320, the UE provides the user data by executing a client application. In substep 2311 (which can be optional) of step 2310, the UE executes a client application which provides the user data in reaction to the received input data provided by the host computer. In providing the user data, the executed client application can further consider user input received from the user. Regardless of the specific manner in which the user data was provided, the UE initiates, in substep 2330 (which can be optional), transmission of the user data to the host computer. In step 2340 of the method, the host computer receives the user data transmitted from the UE, in accordance with the teachings of the embodiments described throughout this disclosure.

FIG. 24 is a flowchart illustrating an exemplary method and/or procedure implemented in a communication system, in accordance with one embodiment. The communication system includes a host computer, a base station and a UE which can be those described with reference to FIGS. 19 and 20. For simplicity of the present disclosure, only drawing references to FIG. 24 will be included in this section. In step 2410 (which can be optional), in accordance with the teachings of the embodiments described throughout this disclosure, the base station receives user data from the UE. In step 2420 (which can be optional), the base station initiates transmission of the received user data to the host computer. In step 2430 (which can be optional), the host computer receives the user data carried in the transmission initiated by the base station.

The term unit can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments of the techniques, apparatus, systems, and computer-readable media described herein include, but are not limited to, the following enumerated examples:

1. A method performed by an integrated access backhaul (IAB) node of a radio access network (RAN) in a wireless communication network that also comprises a core network (CN), the method comprising:
   performing a registration with a CN node, wherein a packet data connection and protocol data unit (PDU) resources are neither requested nor setup during the registration;
   establishing a secure connection with the RAN;
   receiving, from the RAN via the secure connection, configuration information for one or more radio bearers usable for backhaul of at least one of control plane (CP) and user plane (UP) information from the IAB node; and
   establishing, via at least one of the radio bearers usable for backhaul, one or more Internet Protocol (IP) addresses usable by the IAB node.
2. The method of embodiment 1, wherein the one or more radio bearers are associated with an adaptation layer between the IAB node and one or more other nodes in the RAN.
3. The method of embodiments 1-2, wherein performing a registration with a CN node comprises sending the CN node one of: an identifier of the IAB node; and information that distinguishes the IAB node from a user equipment (UE).
4. The method of embodiments 1-2, wherein establishing the one or more IP addresses comprises: receiving a Router Advertisement message over one of the radio bearers; and determining the one or more IP addresses based on the content of the Router Advertisement message.

5. The method of embodiment 4, further comprising sending an indication of the one or more IP addresses to one or more other RAN nodes using a Neighbour Discovery Protocol (NDP).
6. The method of embodiments 1-2, wherein establishing the one or more IP addresses comprises receiving the one or more IP addresses from another node in the RAN via one of: a Radio Resource Control (RRC) protocol, an adaptation layer protocol, Dynamic Host Configuration Protocol (DHCP), and Address Resolution Protocol (ARP).
7. The method of embodiments 1-2, wherein establishing the one or more IP addresses comprises:
    sending a request for at least one IP address via one of the radio bearers, wherein the request is one of: a DHCP request, a Neighbor Discovery Protocol (NDP) message, an Internet Router Discovery Protocol (IRDP) message, and a request comprising an adaption layer procedure; and
    receiving the one or more IP addresses in response to the request.
8. The method of any of embodiments 1-7, wherein the one or more IP addresses comprise a plurality of IP addresses, each IP address associated with a different backhaul bearer or with different quality of service (QoS) class.
9. A method performed by a node, in a core network (CN) of a wireless network that also comprises a radio access network (RAN), for configuring an integrated access backhaul (IAB) node in the RAN, the method comprising:
    receiving a registration request from the IAB node, wherein the registration request does not include a request for either a packet data connection or protocol data unit (PDU) resources;
    determining that the registration request pertains to the IAB node rather than a user equipment (UE);
    registering the IAB node, wherein the registration does not include setup of a packet data connection or PDU resources; and
    establishing a context for the IAB node in the RAN, wherein the context includes information distinguishing the IAB node from a UE.
10. The method of embodiment 9, wherein the context for the IAB node in the RAN excludes a default radio bearer configuration.
11. The method of embodiments 10-11, wherein the registration request comprises one of: an identifier of the IAB node; and information that distinguishes the IAB node from a user equipment (UE).
12. A method performed by one or more nodes, in radio access network (RAN) of a wireless network that also comprises a core network (CN), for configuring an integrated access backhaul (IAB) node in the RAN, the method comprising:
    establishing, via communication with a CN node, context information for the IAB node in the RAN, wherein the context includes information distinguishing the IAB node from a user equipment (UE);
    establishing a secure connection with the IAB node;
    sending, to the IAB node via the secure connection, configuration information for one or more radio bearers usable for backhaul of at least one of control plane (CP) and user plane (UP) information from the IAB node; and
    establishing, via at least one of the radio bearers usable for backhaul, one or more Internet Protocol (IP) addresses usable by the IAB node.
13. The method of embodiment 12, wherein the context for the IAB node in the RAN excludes a default radio bearer configuration.
14. The method of embodiments 12-13, wherein the one or more radio bearers are associated with an adaptation layer between the IAB node and one or more other nodes in the RAN.
15. The method of embodiments 12-14, wherein establishing the one or more IP addresses comprises sending a Router Advertisement message to the IAB node via one of the radio bearers.
16. The method of embodiment 15, wherein establishing the one or more IP addresses comprises further comprises receiving an indication of the one or more IP addresses via a Neighbour Discovery Protocol (NDP) message from the IAB node via one of the radio bearers.
17. The method of embodiments 12-14, wherein establishing the one or more IP addresses comprises sending the one or more IP addresses to the IAB node via one of: a Radio Resource Control (RRC) protocol, an adaptation layer protocol, Dynamic Host Configuration Protocol (DHCP), and Address Resolution Protocol (ARP).
18. An integrated access backhaul (IAB) node configurable for operation in a radio access network (RAN) of a wireless communication network that also comprises a core network (CN), the IAB node comprising:
    processing circuitry configured to perform operations corresponding to any of the methods of embodiments 1-8; and
    power supply circuitry configured to supply power to the IAB node.
19. A network node configurable for operation in a core network (CN) of a wireless communication network that also comprises a radio access network (RAN), the CN node comprising:
    processing circuitry configured to perform operations corresponding to any of the methods of embodiments 9-11; and
    power supply circuitry configured to supply power to the CN node.
20. A network node configurable for operation in a radio access network (RAN) of a wireless communication network that also comprises a core network (CN), the RAN node comprising:
    processing circuitry configured to perform operations corresponding to any of the methods of embodiments 12-17; and
    power supply circuitry configured to supply power to the RAN node.
21. A communication system including a host computer comprising:
    processing circuitry configured to provide user data; and
    a communication interface configured to forward the user data to a cellular network for transmission to a user equipment (UE) through a core network (CN) and a radio access network (RAN);
    wherein:
    the RAN comprises an integrated access backhaul (IAB) node;
    the IAB node comprises a radio interface and processing circuitry configured for communication with the UE, with one or more other RAN nodes, and one or more nodes in a core network (CN);
the radio interface and processing circuitry are further configured to perform operations corresponding to any of the methods of embodiments 1-8.

22. The communication system of embodiment 21, further comprising the UE configured to communicate with the IAB node.

23. The communication system of any of embodiments 21-22, wherein:
the processing circuitry of the host computer is configured to execute a host application, thereby providing the user data; and
the UE comprises processing circuitry configured to execute a client application associated with the host application.

24. The communication system of any of embodiments 21-23, wherein the communication system comprises one or more CN nodes configurable to perform operations corresponding to any of the methods of embodiments 9-11.

25. The communication system of any of embodiments 21-24, wherein the communication system comprises one or more RAN nodes configurable to perform operations corresponding to any of the methods of embodiments 12-17.

26. A method implemented in a communication system including a host computer, a cellular network, and a user equipment (UE), the method comprising:
at the host computer, providing user data;
at the host computer, initiating a transmission carrying the user data to the UE via a cellular network comprising at least an integrated access backhaul (IAB) node; and
operations, performed by the IAB node, corresponding to any of the methods of embodiments 1-8.

27. The method of embodiment 26, wherein the data message comprises the user data, and further comprising transmitting the user data by the access node.

28. The method of any of embodiments 26-27, wherein the user data is provided at the host computer by executing a host application, the method further comprising, at the UE, executing a client application associated with the host application.

29. The method of any of embodiments 26-28, further comprising operations corresponding to any of the methods of embodiments 9-11, said operations performed by a core network (CN) node.

30. The method of any of embodiments 26-29, further comprising operations corresponding to any of the methods of embodiments 12-17, said operations performed by one or more radio access network (RAN) nodes.

31. A communication system including a host computer comprising a communication interface configured to receive user data originating from a transmission from a user equipment (UE) to an access node; and integrated access backhaul (IAB) node comprising a radio interface and processing circuitry configured to perform operations corresponding to any of the methods of embodiments 1-8.

32. The communication system of embodiment 31, further including a core network (CN) node configurable to perform operations corresponding to any of the methods of embodiments 9-11.

33. The communication system of embodiments 31-32, further including a radio access network (RAN) node configurable to perform operations corresponding to any of the methods of embodiments 12-17.

34. The communication system of any of embodiments 31-33, further including the UE, wherein the UE is configured to communicate with the IAB node.

35. The communication system of any of embodiments 31-34, wherein:
the processing circuitry of the host computer is configured to execute a host application;
the UE is configured to execute a client application associated with the host application, thereby providing the user data to be received by the host computer.

The invention claimed is:

1. A method performed by an integrated access backhaul (IAB) node of a radio access network (RAN) associated with a core network (CN), the method comprising:
performing a registration with a CN node;
establishing a secure connection with a centralized unit (CU) of a RAN node;
receiving, from the CU of the RAN node via the secure connection, configuration information for one or more radio bearers between the IAB node and the RAN node, wherein the one or more radio bearers are adapted for backhaul of at least one of the following: control plane information, or user plane information; and
establishing, with a distributed unit (DU) of the RAN node via at least one of the one or more radio bearers, one or more Internet Protocol (IP) addresses usable by the IAB node.

2. The method of claim 1, wherein the one or more radio bearers are associated with an adaptation layer between the IAB node and the RAN node.

3. The method of claim 1, wherein performing the registration with the CN node comprises sending the CN node one of the following: an identifier of the IAB node, or information that distinguishes the IAB node from a user equipment (UE).

4. The method of claim 1, wherein a packet data connection and protocol data unit resources are neither requested nor setup during the registration.

5. The method of claim 1, wherein establishing the one or more IP addresses comprises:
receiving a Router Advertisement message via one of the one or more radio bearers; and
determining the one or more IP addresses based on the content of the Router Advertisement message.

6. The method of claim 5, wherein establishing the one or more IP addresses further comprises sending an indication of the one or more IP addresses via a Neighbor Discovery Protocol (NDP) message to the RAN node via one of the one or more radio bearers.

7. The method of claim 1, wherein establishing the one or more IP addresses comprises receiving the one or more IP addresses from the RAN node via one of the following:
Radio Resource Control (RRC) protocol;
an adaptation layer protocol;
Dynamic Host Configuration Protocol (DHCP); or
Address Resolution Protocol (ARP).

8. The method of claim 1, wherein establishing the one or more IP addresses comprises:
sending a request for at least one IP address via one of the one or more radio bearers, wherein the request is one of the following:
a Dynamic Host Configuration Protocol (DHCP) request, a Neighbor Discovery Protocol (NDP) message,
an Internet Router Discovery Protocol (IRDP) message, or
a request comprising an adaptation layer procedure; and
receiving the one or more IP addresses in response to the request.

9. The method of claim 1, wherein the one or more IP addresses comprise a plurality of IP addresses, each IP address associated with a different backhaul bearer or with a different quality of service (QoS) class.

10. The method of claim 1, wherein establishing the secure connection comprises:
receiving a security mode command from the RAN node;
deriving security keys for the secure connection; and
sending a security mode complete message to the RAN node.

11. An integrated access backhaul (IAB) node configured for operation in a radio access network (RAN) of a wireless communication network that includes a core network (CN), the TAB node comprising:
communication interface circuitry configured to communicate with one or more RAN nodes and with one or more user equipment; and
processing circuitry operably coupled with the communication interface circuitry, wherein the communication interface circuitry and the processing circuitry are configured to perform operations corresponding to the method of claim 1.

12. A method performed by a node, in radio access network (RAN) associated with a core network (CN), for configuring an integrated access backhaul (IAB) node of the RAN, the method comprising:
receiving, by a centralized unit (CU) of the RAN node, context information for the IAB node from a CN node, wherein the context information includes information distinguishing the IAB node from a user equipment (UE);
establishing, by the CU, a secure connection with the IAB node;
sending, by the CU to the IAB node via the secure connection, configuration information for one or more radio bearers adapted for backhaul of at least one of the following: control plane information, or user plane information; and
establishing, by a distributed unit (DU) of the RAN node with the IAB node via at least one of the one or more radio bearers, one or more Internet Protocol (IP) addresses usable by the IAB node.

13. The method of claim 12, wherein the context for the IAB node excludes a default radio bearer configuration.

14. The method of claim 12, wherein the one or more radio bearers are associated with an adaptation layer between the IAB node and one or more other RAN nodes.

15. The method of claim 12, wherein establishing the one or more IP addresses comprises sending a Router Advertisement message to the IAB node via one of the one or more radio bearers.

16. The method of claim 15, wherein establishing the one or more IP addresses further comprises receiving an indication of the one or more IP addresses via a Neighbor Discovery Protocol (NDP) message from the IAB node via one of the one or more radio bearers.

17. The method of claim 12, wherein establishing the one or more IP addresses comprises sending the one or more IP addresses to the IAB node via one of the following:
Radio Resource Control (RRC) protocol;
an adaptation layer protocol;
Dynamic Host Configuration Protocol (DHCP); or
Address Resolution Protocol (ARP).

18. The method of claim 12, wherein establishing the one or more IP addresses comprises:
receiving a request for at least one IP address via one of the one or more radio bearers, wherein the request is one of the following:
a Dynamic Host Configuration Protocol (DHCP) request,
a Neighbor Discovery Protocol (NDP) message,
an Internet Router Discovery Protocol (IRDP) message, or
a request comprising an adaption layer procedure; and
sending the one or more IP addresses in response to the request.

19. A network node configured for operation in a radio access network (RAN) of a wireless communication network that includes a core network (CN), the network node comprising:
communication interface circuitry configured to communicate with one or more integrated access backhaul (IAB) nodes, with one or more user equipment, and with one or more CN nodes; and
processing circuitry operably coupled with the communication interface circuitry, wherein the communication interface circuitry and the processing circuitry are configured to perform operations corresponding to the method of claim 12.

* * * * *